(12) United States Patent
Gamache

(10) Patent No.: US 9,145,977 B2
(45) Date of Patent: Sep. 29, 2015

(54) ACTUATOR

(71) Applicant: MECANIQUE ANALYTIQUE INC., Thetford Mines (CA)

(72) Inventor: Yves Gamache, Adstock (CA)

(73) Assignee: MÉCANIQUE ANALYTIQUE INC., Quebec (CA)

( * ) Notice: Subject to any disclaimer, the term of this patent is extended or adjusted under 35 U.S.C. 154(b) by 0 days.

(21) Appl. No.: 14/487,374

(22) Filed: Sep. 16, 2014

(65) Prior Publication Data

US 2015/0069276 A1  Mar. 12, 2015

Related U.S. Application Data

(63) Continuation of application No. 13/542,244, filed on Jul. 5, 2012, now Pat. No. 8,864,102.

(60) Provisional application No. 61/508,095, filed on Jul. 15, 2011.

(51) Int. Cl.
| | |
|---|---|
| *F16K 31/126* | (2006.01) |
| *F16K 31/165* | (2006.01) |
| *F15B 11/036* | (2006.01) |
| *F15B 15/10* | (2006.01) |

(52) U.S. Cl.
CPC ............. *F16K 31/165* (2013.01); *F15B 11/036* (2013.01); *F15B 15/10* (2013.01); *F16K 31/126* (2013.01); *F16K 31/1262* (2013.01); *F16K 31/1268* (2013.01); *Y10T 137/0491* (2015.04)

(58) Field of Classification Search
CPC . F16K 31/165; F16K 31/126; F16K 31/1262; F16K 31/1268; F15B 15/10; F15B 11/036

USPC ............... 251/61, 61.2, 63.5; 92/100
See application file for complete search history.

(56) References Cited

U.S. PATENT DOCUMENTS

| | | | |
|---|---|---|---|
| 2,287,841 A | 6/1942 | Tabb | |
| 5,131,627 A | 7/1992 | Kolenc | |
| 5,215,286 A | 6/1993 | Kolenc | |
| 5,653,419 A | 8/1997 | Uchisawa et al. | |
| 5,755,428 A | 5/1998 | Ollivier | |
| 6,192,912 B1 | 2/2001 | Butler et al. | |
| 6,508,453 B2 | 1/2003 | Mamyo | |

(Continued)

FOREIGN PATENT DOCUMENTS

EP          56893 A1    8/1982

*Primary Examiner* — Kevin Murphy
*Assistant Examiner* — Daphne M Barry
(74) *Attorney, Agent, or Firm* — Hovey Williams LLP

(57) ABSTRACT

An actuator for actuating a plunger of a valve is provided. The actuator has an inlet and includes first and second hollow caps. A main actuation assembly is provided between the caps. The main actuation assembly includes a deformable diaphragm; first and second chambers, static sealing elements and a main piston movable between actuated and unactuated positions. A biasing mechanism biases the piston in the unactuated position. When pressurized gas is flown through the inlet and/or drawn from the outlet of the actuator, the first chamber expands, moving the main piston from the unactuated position to the actuated position, an actuating stem connected to the main piston thereby sliding within a channel provided in the bottom cap. Stackable actuating assemblies can also be used between the caps. Using static sealing elements advantageously avoids friction between moving parts.

17 Claims, 38 Drawing Sheets

(56) References Cited

U.S. PATENT DOCUMENTS

| | | |
|---|---|---|
| 6,604,451 B1 | 8/2003 | Yasuda |
| 7,159,839 B2 | 1/2007 | Tanikawa et al. |
| 7,832,327 B2 | 11/2010 | Gethmann et al. |
| 2005/0139061 A1 | 6/2005 | Timko et al. |
| 2009/0283152 A1 | 11/2009 | Mason |
| 2010/0090151 A1 | 4/2010 | Tanikawa et al. |

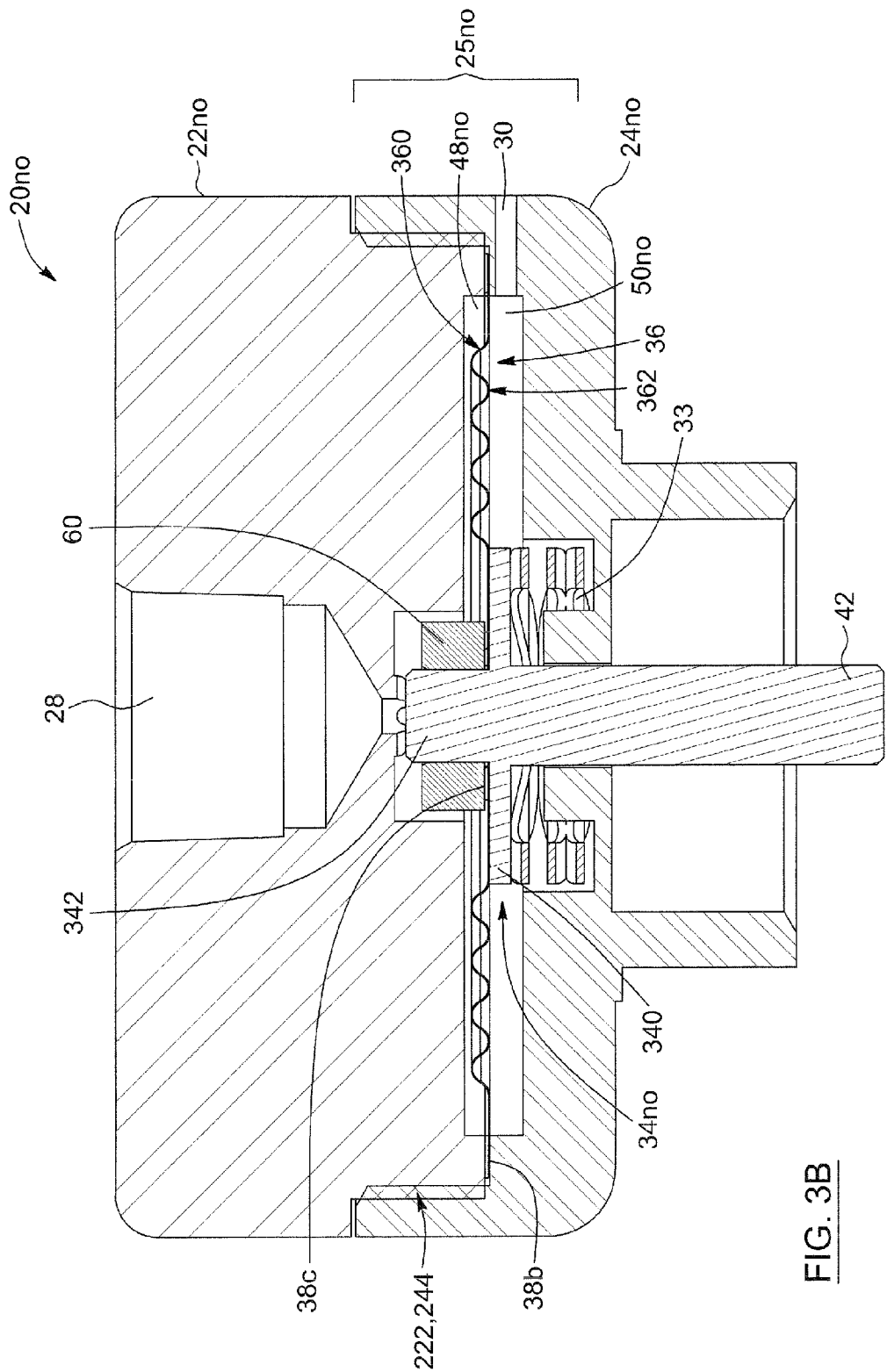

ACTUATOR

CROSS-REFERENCE TO RELATED APPLICATIONS

The present application is a continuation of U.S. patent application Ser. No. 13/542,244, filed Jul. 5, 2012, which claims the priority benefit of U.S. Provisional Patent Application Ser. No. 61/508,095, filed Jul. 15, 2011, each of which is incorporated by reference in its entirety herein.

FIELD OF THE INVENTION

The present invention generally relates to actuators and more particularly concerns a pneumatic actuator used to actuate plungers or pistons in valves.

BACKGROUND

Pneumatic actuators are used in different types of applications, and serve to actuate or move plungers, shafts and the likes in different types of devices, such as valves.

An actuator can include a normally closed piston, a normally open piston, or both within the same assembly. An actuator including a normally closed piston is typically provided with a biasing element, such as a spring or Belleville washers, which biases the piston in a closed position. In order to move the piston from the closed to the open position, gas is injected within the actuator, counteracting the biasing action of the spring and allowing the piston to move towards the open position. Similarly, normally opened pistons may be biased in their open position and moved to the closed position through the effect of gas pressure thereon.

In order to isolate and seal the chamber in which the gas in injected, dynamic seals are generally used. An example of valve construction based on this principle is shown in FIG. 1 (PRIOR ART). In this example, the normally closed and normally open pistons 12, 14 of an actuating mechanism 10 are both provided with polymer, silicone or rubber O-rings 16 along their outer periphery. When the pistons move up and down within the valve, the O-rings 16 slide and rub against the inner wall of the cylindrical body 18 of the valve.

When actuators are used in high-temperature applications, sometimes as high as 350° C., the dynamic seals tend to become sticky and brittle over time. This increases the friction between the seal and the inner wall of the actuating system, impairing movement of the pistons. Lubricants can be used to minimize this friction, but their use generates other problems: grease-based lubricants, such as Krytox™ or Torrlube™ eventually dry down, increasing even more the friction and making it harder for the pistons to move. The use of dry lubricants is usually not considered an alternative, as they are eventually blown away by the actuating gas used. Similar difficulties are also encountered in solenoid valves in which the pistons are actuated using an electrical current.

The degradation of the dynamic seals does not only occur in high temperature applications. The problem is also present in cryogenic applications, where valves are used in very low temperature conditions. In this case, the humidity present in the actuating gas tends to crystallize at the interface of the pistons and the inner wall of the actuating system, impairing the movement of the pistons.

There is thus a need for an actuator which can help reduce or eliminate friction between moving parts. For some applications, it would also be desirable for this actuator to impart a higher force to the shaft or plunger it actuates, while keeping the actuating pressure low. For some applications, the mechanism would also need to have a long operating life and be able to move the shaft or plunger at high speed.

Many solutions have been proposed in order to solve this issue. U.S. Pat. No. 5,755,428 shows a valve having a metal-to-metal dynamic seating. While the described type of actuator may be appropriate for ambient or relatively medium temperature, it is not readily usable in high temperature or cryogenic applications. There are 6 O-rings involved in this design. High friction and embrittlement of those O-rings is likely to result if used at cryogenic or at high temperature, like 350° C.

Also known in the art are U.S. Pat. No. 5,131,627, U.S. Pat. No. 5,215,286, U.S. Pat. No. 5,653,419, U.S. Pat. No. 6,508,453, U.S. Pat. No. 7,159,839 and US 20100090151. Some of these solutions use cam mechanisms, gear-cam and pinion mechanisms, or multiple pistons in order to increase the effective total weight or force to the actuated shaft or rod. These solutions require the use of several small hard-to-machine parts which render the mechanism complex and difficult to assemble or maintain, in addition to increasing the manufacturing costs.

In light of the above, there is a need for an improved pneumatic actuator.

SUMMARY OF THE INVENTION

In accordance with an aspect of the present invention, there is provided a pneumatic actuator for actuating a plunger. The actuator can be used in different applications, such as, but not limited to, analytical, process, instrumentation or industrial applications. It can be also used from cryogenic to high temperature applications.

The actuator comprises a main inlet and a main outlet, and first and second hollow caps facing one another. The second cap is provided with a cap channel extending therethrough.

The actuator also comprises a main actuation assembly provided between the first and second hollow caps. This main actuation assembly includes a deformable diaphragm having opposite first and second diaphragm surfaces, a first chamber and a second chamber. The first chamber is limited by the first diaphragm surface and is in fluid communication with the main inlet. The second chamber is limited by the second diaphragm surface, and is in fluid communication with the main outlet.

The actuator also comprises static sealing elements for fluidly sealing the first and second chambers.

The actuator also comprises a main piston and an actuating stem. The main piston is movable between actuated and unactuated positions, and includes a piston surface operatively attachable to the second diaphragm surface. The actuating stem slidably fits in the cap channel, a portion of the stem extending outside of the second cap, said portion of the stem being connectable to the plunger. The actuating stem cooperates with the main piston so as to slide within the cap channel when the main piston moves between the actuated and unactuated positions.

The actuator also comprises a biasing mechanism biasing the piston in the unactuated position.

When pressurized fluid is forced through the main inlet or drawn from the main outlet, or both, the first chamber of the main actuating assembly expands, moving the main piston from the unactuated position to the actuated position, the actuating stem thereby sliding within the cap channel By flexible diaphragm, it is mean a flexible membrane or component adapted to deform.

Advantageously, the use of a deformable diaphragm in the actuating mechanism of the present invention eliminates the need for dynamic seals, that is, seals which move with the pistons in conventional actuating mechanisms. Avoiding the use of conventional seals reduces friction of parts within the actuator, increasing in turn the lifetime of the actuating mechanism, regardless of temperature conditions in which it is used. In order to preserve the air-tight properties of the chambers within the mechanism, static seals can be used, such as copper gaskets.

Preferably, the actuator can also comprise at least one stackable secondary actuating assembly disposed between the first and second caps. Each assembly comprises a cartridge inlet and a cartridge outlet. Each assembly also comprises an actuating cartridge, an intermediate deformable diaphragm, first and second intermediate chambers, static cartridge sealing elements, and an intermediate piston. The actuating cartridge is provided with a cartridge channel. The intermediate deformable diaphragm has opposite first and second surfaces. The first intermediate chamber is limited by the first surface of the intermediate diaphragm, and is in fluid communication with the cartridge inlet. The second intermediate chamber is limited by the second surface of the intermediate diaphragm, and is in fluid communication with the cartridge outlet.

The static cartridge sealing elements are for fluidly sealing the first and second intermediate chambers. The intermediate piston is movable between the actuated and unactuated positions and includes a piston surface operatively attached to the second surface of the intermediate diaphragm. The intermediate piston slidably fits in the cartridge channel and operatively cooperates with the main piston.

When pressurized fluid is forced through the cartridge inlet or drawn from the cartridge outlet, or both, the first intermediate chamber expands, moving the intermediate piston from the unactuated position to the actuated position, assisting the sliding of the actuating stem within the cap channel.

Advantageously, the use of one or several stackable secondary actuating assembly(ies) allows increasing the force applied on the actuating stem.

In addition, the use of stackable actuating and/or biasing element cartridges allows modifying and controlling the torque and weight force applied on the actuating shaft, allowing easy customization of the actuating mechanism depending on the requirements of the applications for which it is to be used.

In one embodiment, the actuator comprises one or several stackable biasing element cartridges, connected to one of the first and second caps.

In one embodiment, the actuator is a normally open actuator, the second cap is provided with a circular recess, the biaising mechanism fitting in said circular recess. The main outlet is a vent provided in the second cap and the first chamber is limited by the first cap.

In one embodiment, the actuator is a normally closed actuator, the first cap being provided with a circular recess, the biaising mechanism fitting in the circular recess. The main outlet is a vent provided in the first cap and the first chamber is limited by the second cap.

In one embodiment, the static sealing elements are either brazed joints, polymeric gaskets and metal gaskets, or a combination thereof.

In one embodiment, the cartridge inlet(s) of the at least one stackable secondary actuating assembly(ies) are in fluid communication with the main inlet.

In one embodiment, the actuator comprises a second actuating stem, for actuating a second plunger. The first cap is provided with a second cap channel extending therethrough, the second actuating stem slidably fitting in the second cap channel. A portion of the second actuating stem extends outside of the second cap is and connectable to the second plunger. The second actuating stem slides within the cap channel when the main piston moves between the actuated and unactuated positions. For each stackable actuating assembly, the cartridge inlet is in fluid communication with the main inlet. When pressurized fluid is forced through the cartridge inlet and/or drawn from the cartridge outlet, the first chamber(s) expand(s), the second actuating stem moving with the main piston from the unactuated to the actuated position, both actuating stems thereby moving within their respective cap channels. As such, the first and second actuating stems can move in the same direction, or in opposite directions.

In one embodiment, the actuator is used in combination with a current to pressure converter.

According to another aspect of the invention, there is also provided a kit for mounting an actuator as defined above. The kit comprises the first and second hollow caps, the main actuation assembly including the deformable diaphragm, the main piston, and the static sealing elements, the actuating stem connectable to the main piston; and the biasing mechanism for biasing the piston in the unactuated position.

According to yet another aspect of the invention there is also provided a stackable secondary actuating assembly for use in an actuator as defined above. The stackable secondary actuating is for use between the first and second caps and comprises an actuating cartridge, first and second intermediate deformable diaphragms, an intermediate piston, and static cartridge sealing elements for fluidly sealing the first and second intermediate deformable diaphragm with other components of the valve, when in use.

Other features and advantages of the present invention will be better understood upon reading of preferred embodiments thereof, with reference to the appended drawings.

BRIEF DESCRIPTION OF DRAWINGS

FIG. 3B is a cross-sectional view of the actuator of FIG. 3, taken along line B-B.

Figure 1:
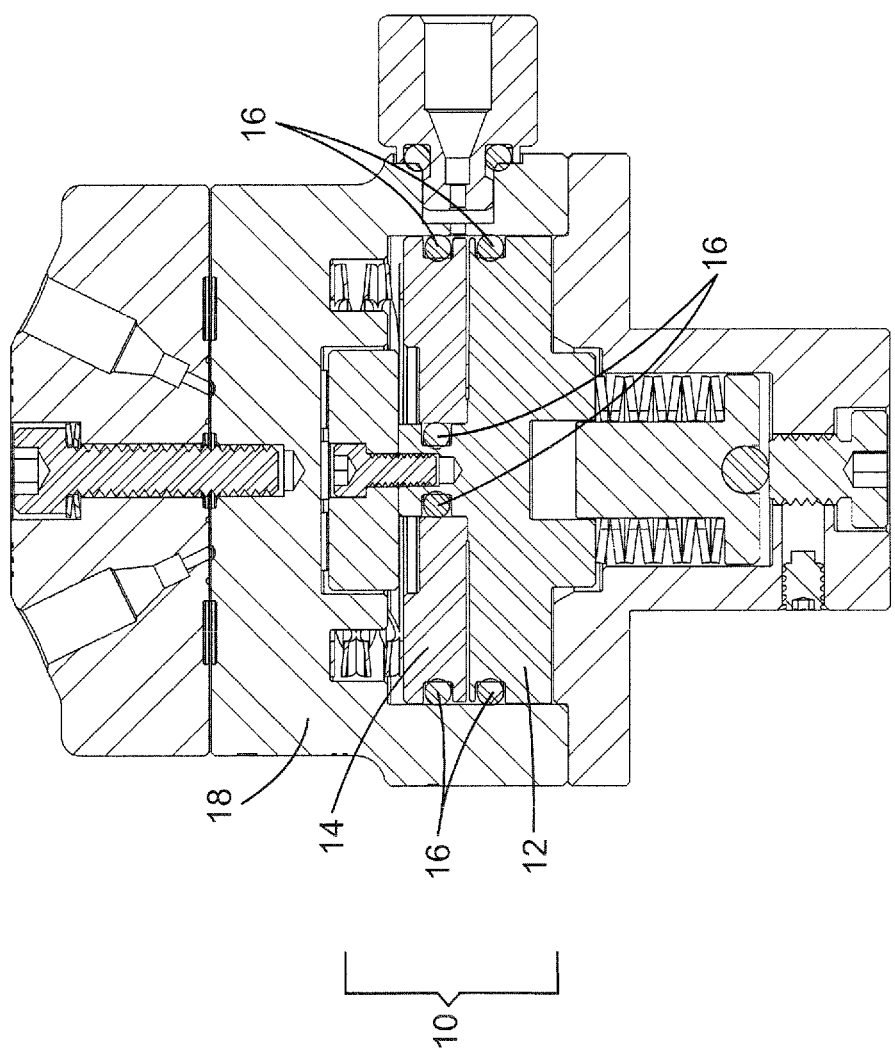
FIG. 1 (PRIOR ART) is a cross-sectional view of a valve including a prior art actuator, including dynamic seals.

While the invention will be described in conjunction with example embodiments, it will be understood that it is not intended to limit the scope of the invention to such embodiments. On the contrary, it is intended to cover all alternatives, modifications and equivalents as may be included as defined by the present application.

DETAILED DESCRIPTION OF PREFERRED EMBODIMENTS OF THE INVENTION

In the following description, similar features in the drawings have been given similar reference numerals. To preserve the clarity of the drawings, some references numerals have been omitted, if they were already identified in a preceding figure.

The embodiments described below are given by way of example only and the various characteristics and particularities thereof should not be considered limitative to the scope of the present invention It will be appreciated that positional descriptions such as "top", "bottom" and the like should, unless otherwise indicated, be taken in the context of the figures and should not be considered limiting.

Figure 2:
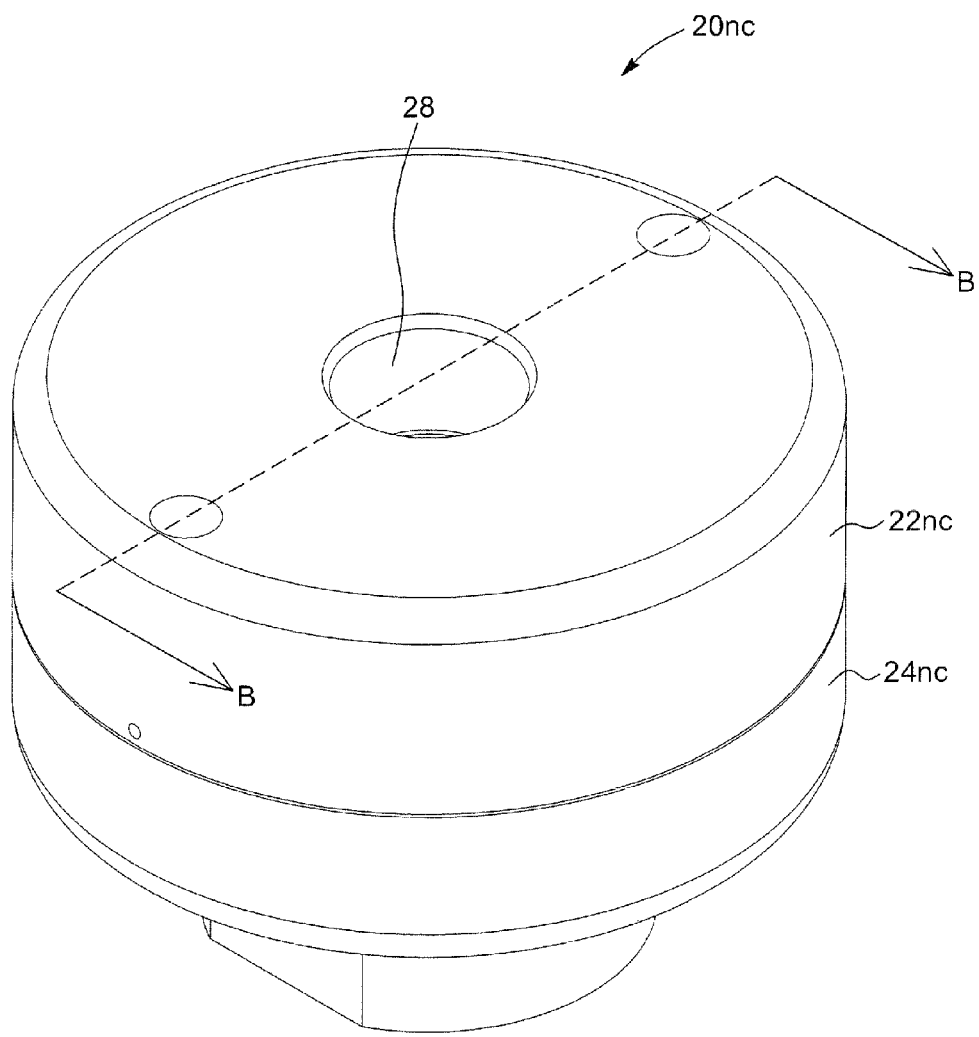
FIG. 2 is a top perspective view of an actuator, according to a first preferred embodiment of the invention.

With reference to FIG. 2, an actuator 20nc for actuating the plunger of valve is shown. The actuator 20nc includes a first cap 22nc and a second cap 24nc, a main inlet 28 and a main outlet 30. The inlet 28 and outlet 30 are ports through which fluid can be forced or drawn. The main inlet 28 is provided in the top cap 22nc. The first and second caps are respectively top and bottom caps 22nc, 24nc and they are facing one another. The top and bottom caps 22nc, 24nc are preferably hollow, and by hollow it is meant that they have as least one recessed portion, even if only slightly recessed. The top and bottom caps 22nc, 24nc shown are cylindrical; however other configurations can be considered.

Figure 2A:
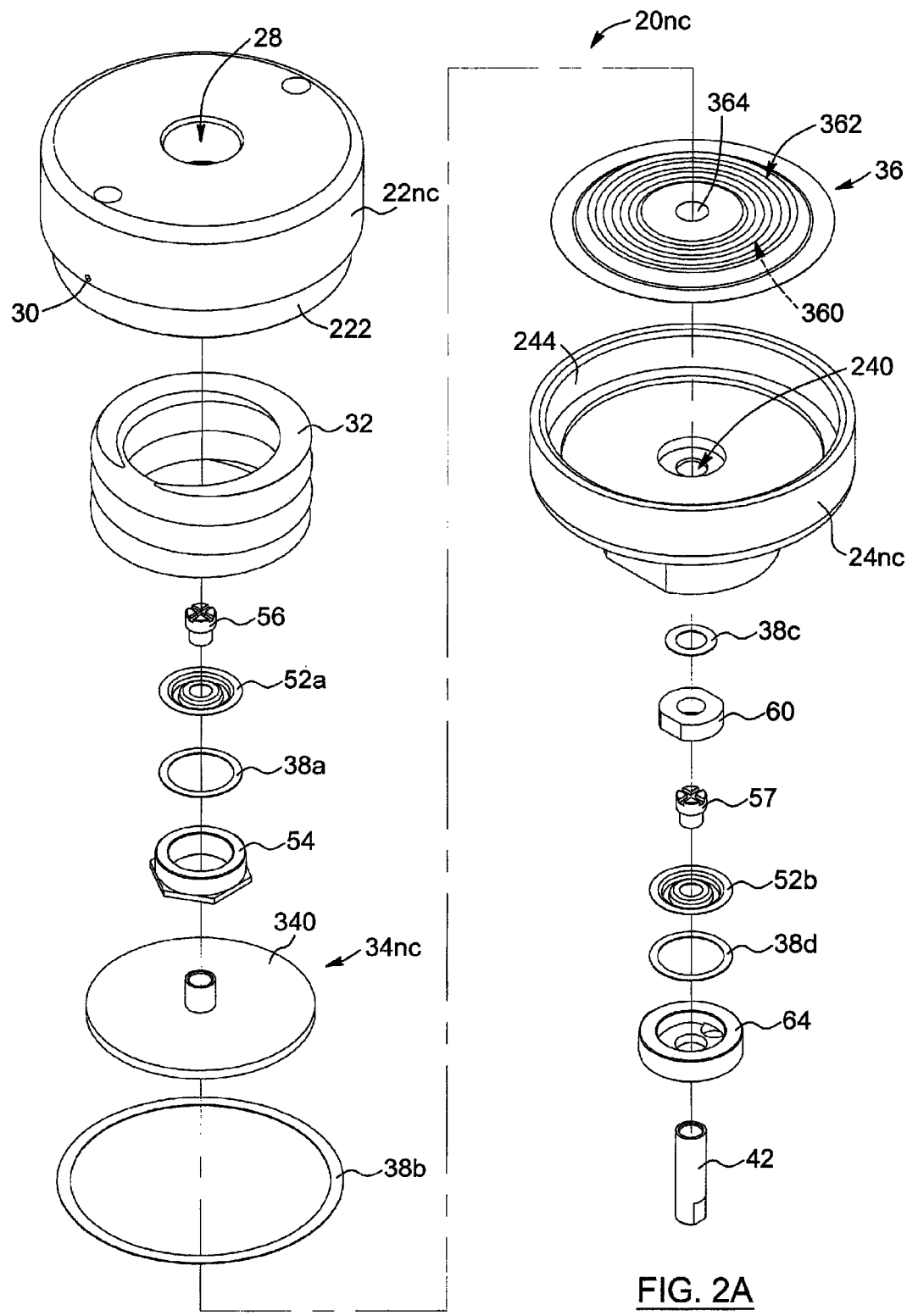
FIG. 2A is an exploded view of the actuator shown in FIG. 2.
Figure 2B:
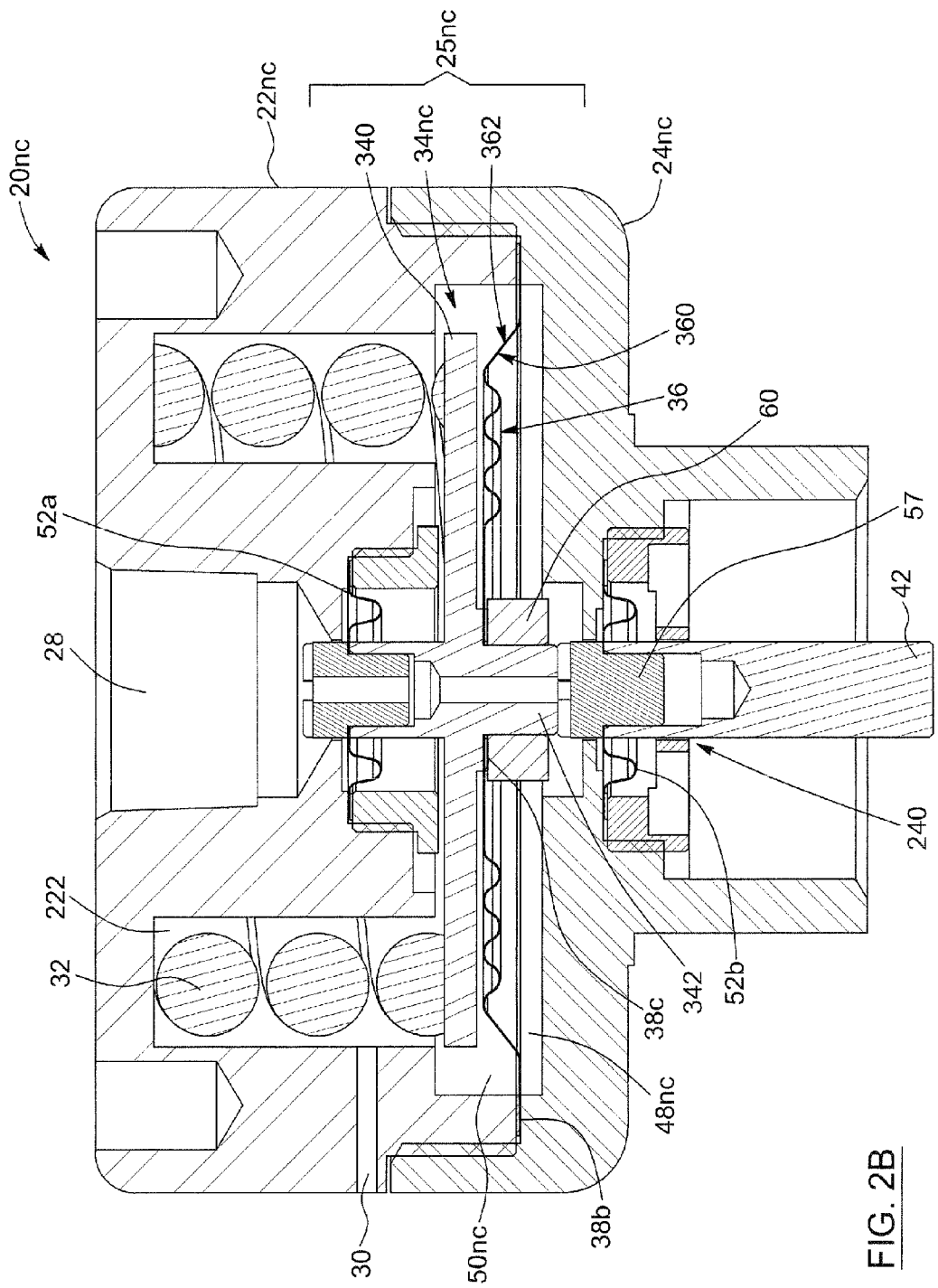
FIG. 2B is a cross-sectional view of the actuator of FIG. 2, taken along line B-B.
Figure 2C:
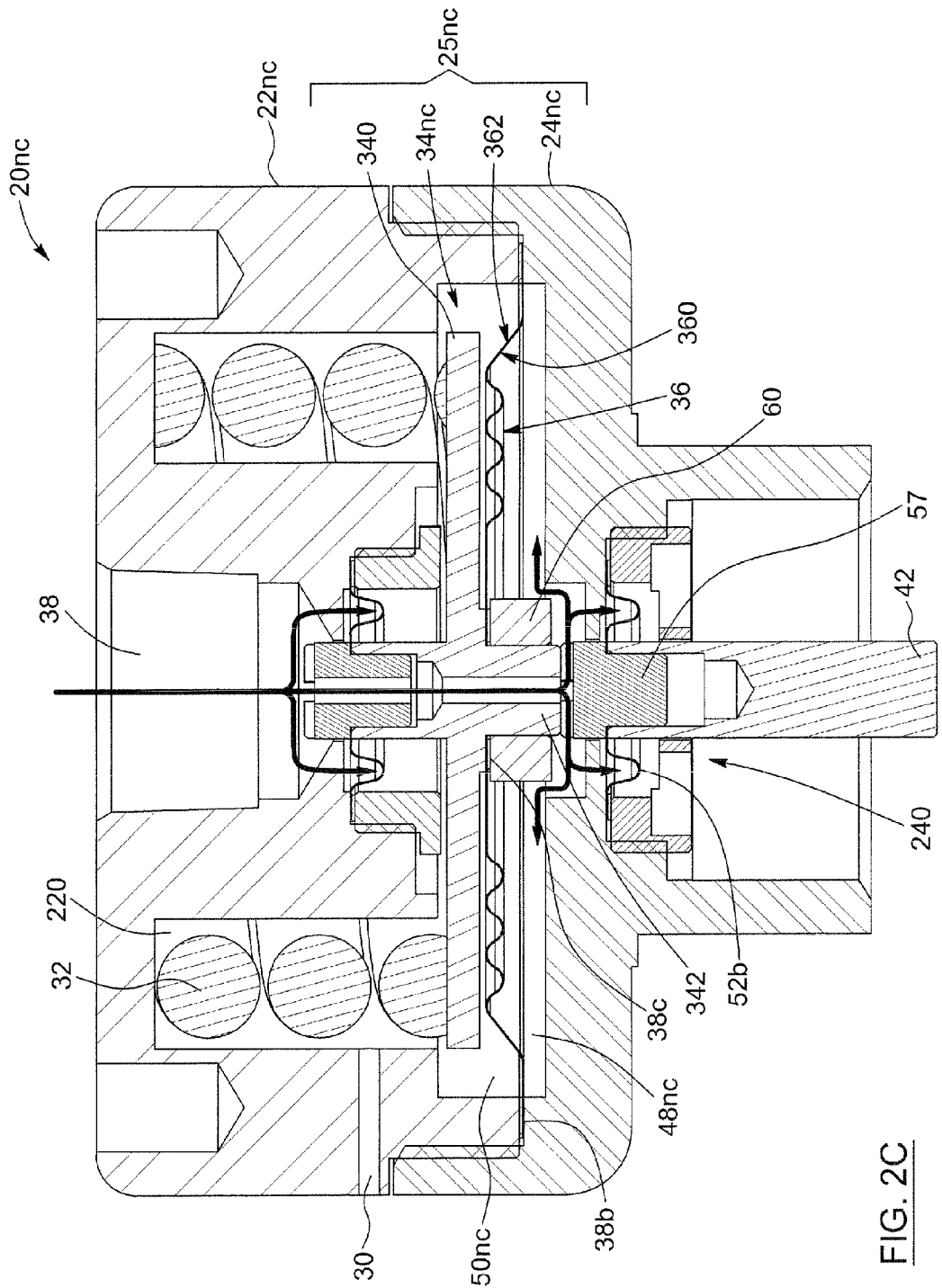
FIG. 2C is a cross-sectional view of the actuator of FIG. 2, taken along line B-B, showing the flow of pressurized fluid within the actuator.

With reference to FIGS. 2A, 2B and 2C, the actuator 20nc includes the main inlet 28, the top and bottom caps 22nc, 24nc, a main actuating assembly 25nc, an actuating stem 42, and a biasing mechanism 32. The main inlet 28 is for receiving pressurized fluid, and while in this embodiment, the inlet 28 is provided in the top cap 22nc, as a channel extending axially within the cap 22nc, it can be considered to locate the inlet elsewhere, such as on the sidewall of the bottom cap 24nc for example. The pressurized fluid can be of any type, gas or liquid.

The actuator 20nc includes a main actuation assembly 25nc, provided between the top and bottom hollow caps 22nc, 24nc. The main actuation 25nc assembly includes a deformable diaphragm 36, a first chamber 48nc, a second chamber 50nc, a main piston 34nc and static sealing elements 38a, 38b, 38c, 38d. In the present case, the static sealing elements are metallic gaskets; however, other types of static sealing elements can be considered, such as polymeric gaskets but also brazed joints. By static sealing elements, it is meant that the sealing elements do not move when the actuator is actuated, and thus there is no friction between the sealing elements or joints and the other components of the actuator. Sealing elements 38a, 38b, 38c and 38d are used to ensure that the first and second chambers 48nc, 50nc are properly sealed, and that the connections between the components are fluid tight.

The deformable diaphragm 36 is circular, with two opposite first and second surfaces 360, 362 and a central hole 364. It is flexible enough to deform under the pressure of a fluid or when being pushed or pressed, and is preferably corrugated. The flexible diaphragm can be any type of fluid tight membrane or component able to move or deform. A flexible diaphragm can be made from different types of materials, such as metals, polymers and/or elastomers. A combination of such elements can also be used. It can also be considered to use bellow(s) as flexible diaphragm(s). Bellows, which are typically made of metal, are elastic vessels that can be compressed when pressure is applied to the outside of the vessel, or extended under vacuum.

The first chamber 48nc is limited by the first diaphragm surface 360 and is in fluid communication with inlet 28, as best shown in FIG. 2C. The first chamber 48nc is airtight in the sense that it can inflate when the actuator 20nc is in use, that is, when connected to a source of pressurized fluid. The second chamber 50nc is limited by the second diaphragm surface 362 and is in fluid communication with the main outlet 30, for expelling fluid. In the present case, the main outlet 30 is a vent.

The main piston 34nc has a piston surface operatively attached to the second surface 362 of the diaphragm 36. In the present case, the piston surface is part of a flange 340, extending in the second chamber 50nc. The main piston can move between actuated and unactuated positions. The actuator of FIGS. 2A-2C is a normally closed actuator: when it is unactuated, that is, when no pressurized fluid is injected through the inlet 28, the biasing mechanism 32, which is in this case an helicoidal spring, presses flange 340, maintaining piston 34nc is a lowered position. When in the actuated position, pressurized fluid is filling the first chamber 48nc, and the first chamber expands, deforming the diaphragm 36, thereby pushing flange 340 upwardly, which in turn compresses the biasing element 32, the piston being in a raised position, as best shown in FIG. 2C. The flange section 340 has a first surface in contact with the biasing element 32, and a second surface with the second diaphragm surface 362. The arrows in FIG. 2C show the flow of pressurized fluid entering trough inlet 28 and filling the first chamber 48nc.

Still referring to FIGS. 2A-2O, the main piston 34nc is provided with a portion 342 passing through the central hole 364 of the diaphragm, extending in the first chamber 48nc. A diaphragm retaining nut 60 is screwed on the portion 342, the central portion of the diaphragm being sealingly compressed between the nut 60 and the flange 340 of the main piston 34nc. A first circular gasket 38c is used for ensure airtight connection of the nut 60, of the region around the central hole 364 of the diaphragm 36 and of the main piston 34nc. Similarly, the outer periphery of the diaphragm 36 is sealingly compressed, between the top and bottom caps 22nc, 24nc, and second circular gasket 38b is used to seal the connection. Of course, other sealing and connecting elements can be considered as long as the first chamber 48nc is airtight when pressurized fluid is injected in the chamber 48nc. The top and bottom caps 22nc, 24nc are provided with threads on their respective lateral walls, and are connected together by screwing. Of course, it can also be considered to join them by soldering or brazing.

An actuating stem 42, or shaft, is sized and shaped to fit in a channel 240, provided in the bottom cap, also referred to as cap channel 240. The actuating stem can slide within the cap channel 240. A portion of the stem 42 extends outside of the bottom cap 24nc. This portion of the stem 42 extending outside the bottom cap 24nc can be connected to a plunger of a valve, or to any other type of device requiring a linear motion. The other side of the stem 42 is operatively connecte to the main piston 34nc, so as to slide within the cap channel 240 when the main piston 34nc moves between the actuated and unactuated position. By operatively connected, it is meant that they can be directly or indirectly connected to one another. They can also be integral with one another, that is, part on the same component. In the present case, the stem 42 is connected, or linked, to the main piston 34 via the screw 57, the main piston resting on the head of the screw 57.

The biasing mechanism 32, in this case a helicoidal spring, biases the piston 34nc in the unactuated position. The biasing element 32 fits in a circular recess 220 provided in the top cap 22nc. As best shown in FIG. 2C, when pressurized fluid is flown through the inlet 28, the first chamber 48nc of the main actuating assembly 25nc expands, moving the piston from the unactuated to the actuated position. The biasing element 32 is thus compressed, allowing the actuating stem 42 to slide within the cap channel 240.

The first chamber 48nc is limited by the bottom cap 24nc. When the first chamber 48nc expands, the second chamber 50nc deflates, since the two chambers are contained in a fixed enclosure formed by the top and bottom caps 22nc, 24nc. The air or fluid contained in the second chamber 50nc is expelled via the vent 30, which is provided in the top cap 22nc. In order to allow the actuating stem 42 to move while keeping the first chamber 48nc airtight, a second deformable diaphragm 52b delimits the first chamber 48nc. The second deformable diaphragm 52b is sealingly retained around its central hole by the screw 57 and the stem 42, and around its outer periphery between a flange of the bottom cap 24nc and a connecting/closing nut 64. The closing nut 64 can be screwed to the bottom cap 24nc, of fixed to it with a set screw. Similarly, another smaller diaphragm 52a allows movement of the piston 34nc while sealingly connecting the main piston 34nc to the top cap 22nc.

Figure 3:
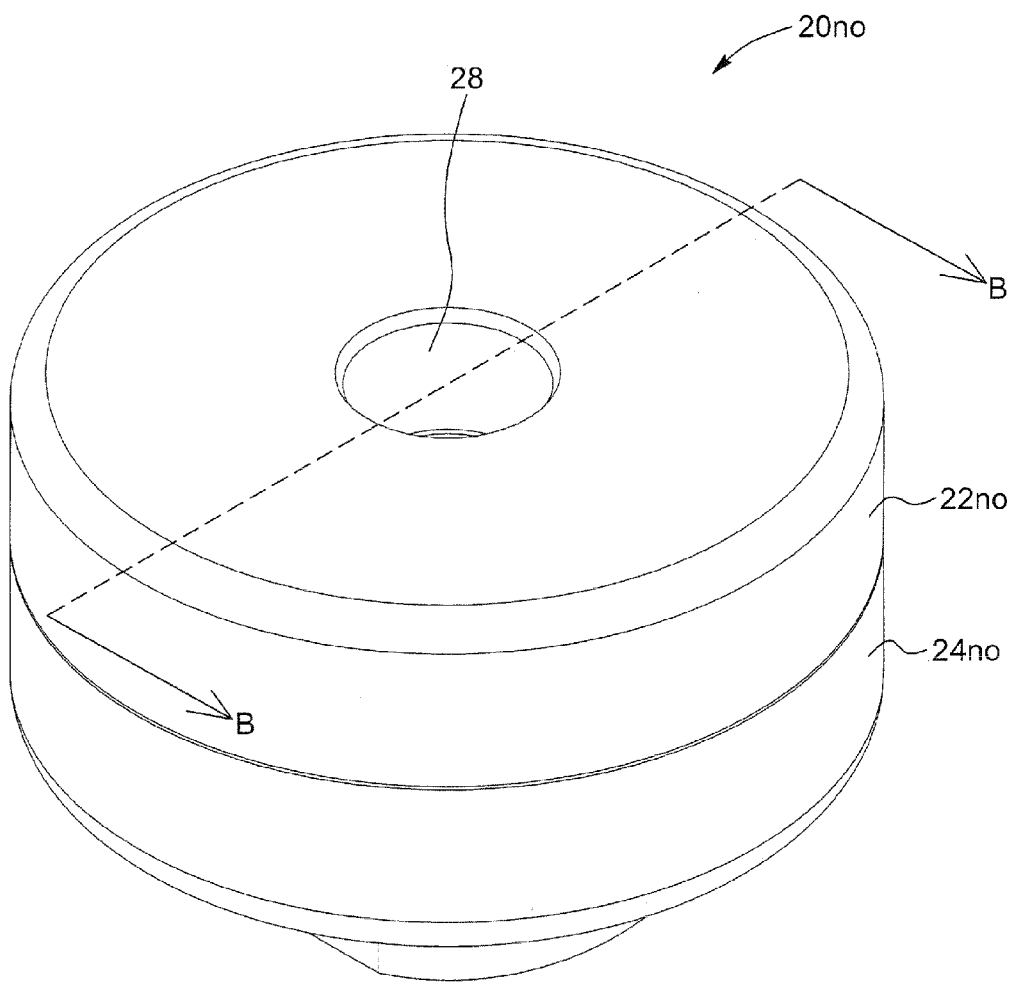
FIG. 3 is a top perspective view of an actuator, according to a second preferred embodiment of the invention.

With reference to FIG. 3, another embodiment of an actuator according to the invention is shown. The actuator 20no includes a top cap 22no and a bottom cap 24no, and an inlet 28 is provided in the top cap 22no. This version of the actuator is a normally open actuator 20no.

Figure 3A:
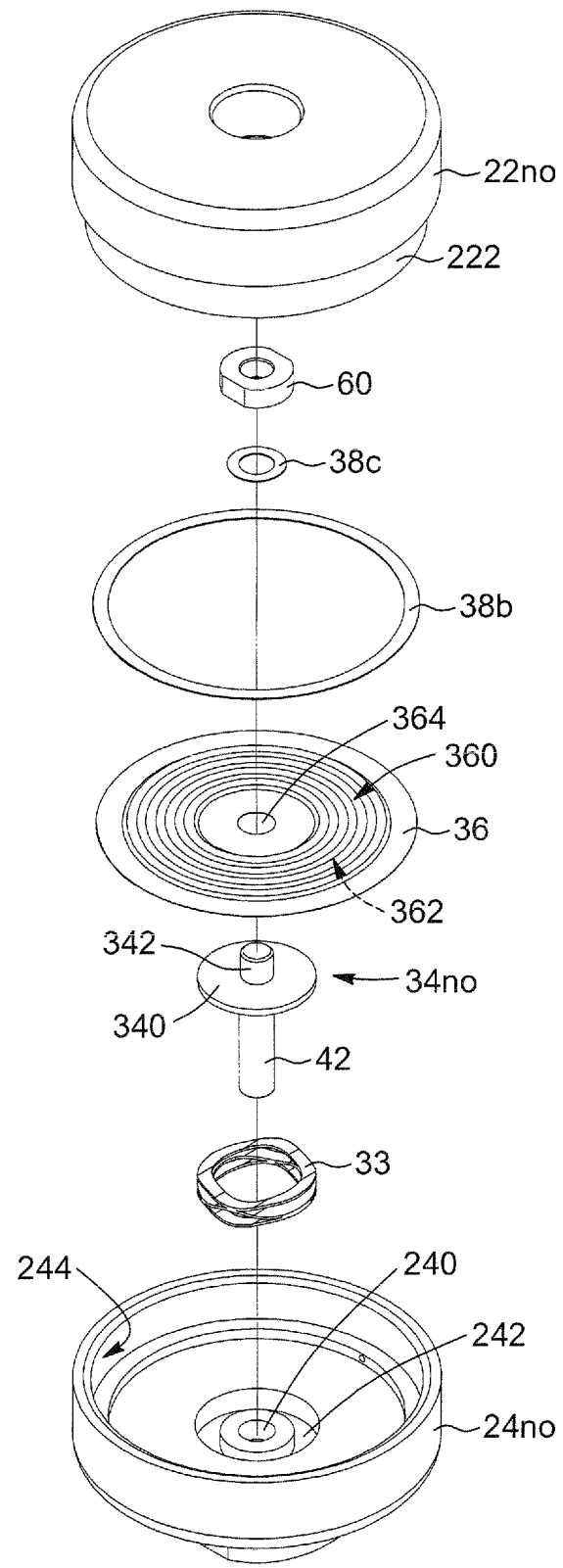
FIG. 3A is an exploded view of the actuator shown in FIG. 3.
Figure 3C:
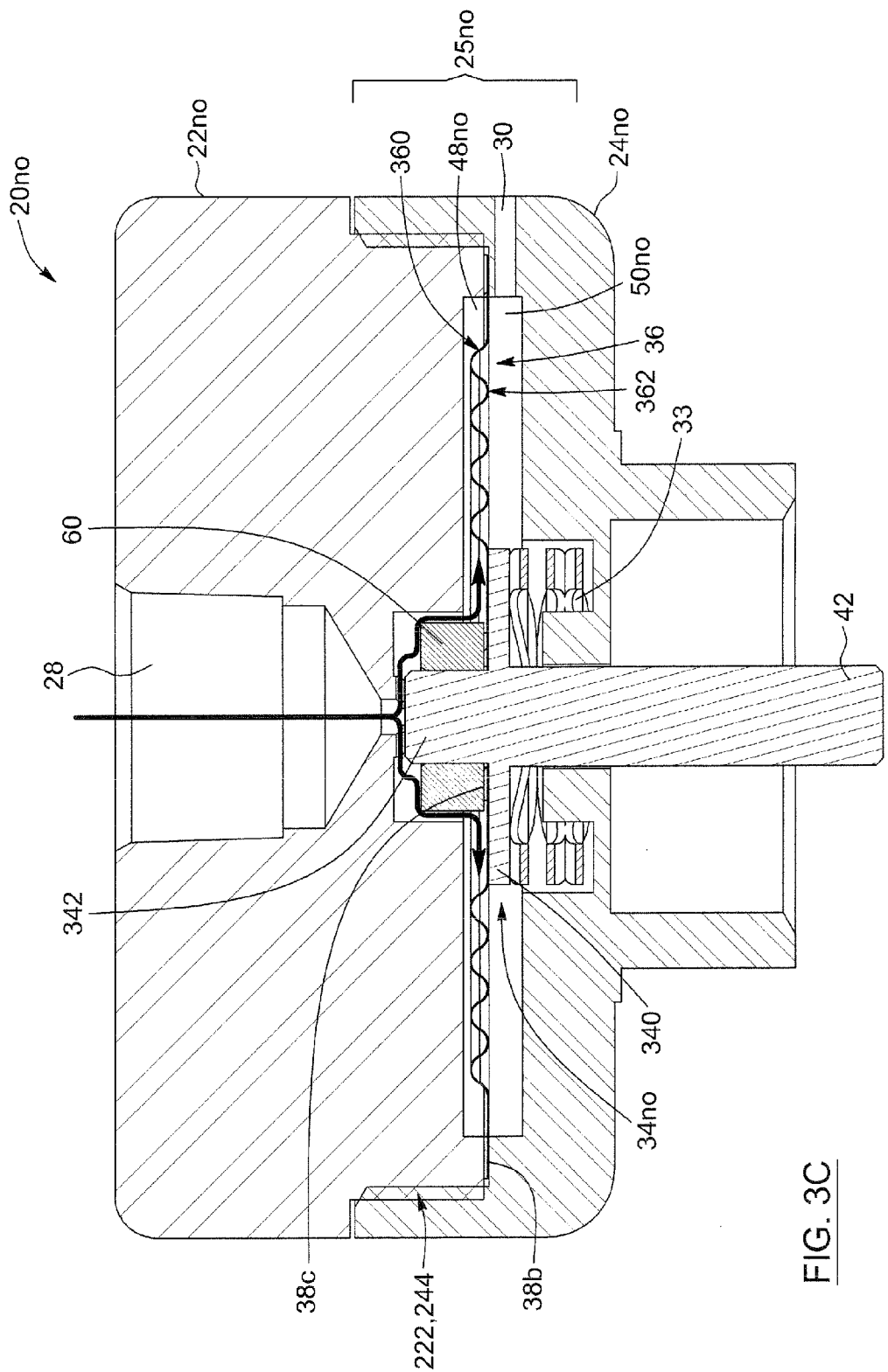
FIG. 3C is a cross-sectional view of the actuator of FIG. 3, taken along line B-B, showing the flow of pressurized fluid within the actuator.

With reference to FIGS. 3A, 3B and 3C, the actuator 20no includes a main inlet 28, first and second caps 22no, 24no, a main actuating assembly 25no, an actuating stem 42, and a biasing mechanism 33. The inlet 28 for receiving pressurized fluid is provided in the top cap 22no; however, it can be considered to locate the inlet 28 elsewhere.

The actuator 20no includes a main actuation assembly 25no, provided between the top and bottom hollow caps 22no, 24no. The main actuation 25no assembly includes a deformable diaphragm 36, a first chamber 48no, a second chamber 50no, a main piston 34no and static sealing elements 38b 38c.

The first chamber 48no is limited by the first diaphragm surface 360 and is in fluid communication with the main inlet 28. In this version of the actuator, the first chamber is on the top side of the diaphragm, rather than on the bottom side, as in the normally closed actuator of FIG. 2. Still referring to FIGS. 3A-3C, the second chamber 50no is limited by the second diaphragm surface 362 and is in fluid communication with the main outlet 30, which is in this case a vent for expelling gas. Static sealing elements 38c and 38d are used to ensure that the connections between the components of the actuator 20no are sealed and airtight, and they advantageously do not move when the piston 34no moves form the actuated to the unactuated positions.

The main piston 34no has a piston surface connectable to the second surface of the diaphragm 362. In this case, the piston surface is part of a flange section 340 extending in the second chamber 50no, underneath the diaphragm 36. The main piston 34no can move between actuated and unactuated positions. The actuator of FIGS. 3A-3C is a normally open actuator: when it is unactuated, that is, when no pressurized fluid is injected through the main inlet 28, the biasing mechanism 33 presses flange 340 and maintaining piston 34no in a raised position. When in the actuated position, pressurized fluid is filling the first chamber 48no, deforming the diaphragm 36, thereby pushing flange 340 downwardly, which in turn compresses the biasing element 33, the actuating stem 42 being is a lowered position, as best shown in FIG. 3C. The flange section 340 has a first surface in contact with the biasing element 33, and a second surface in contact with the second diaphragm surface 362. The arrows in FIG. 3C show the flow of pressurized fluid entering trough inlet 28 and filling the first chamber 48no.

Still referring to FIGS. 3A-3C, the main piston 34no is provided with a portion 342 passing through the central hole 364 of the diaphragm 36, extending in the first chamber 48no. The diaphragm retaining nut 60 is screwed on the portion 342, the diaphragm being sealingly compressed between the nut 60 and the flange 340 of the main piston 34no, around its central hole 364. The gasket 38c is used to provide a fluidtight connection between nut 60 and flange 340. Similarly, the outer periphery of the diaphragm 36 is sealingly compressed, between the top and bottom caps 22no, 24no, and gasket 38d is used to seal the connection. Of course, other sealing and connecting elements can be considered as long as the first chamber 48no is airtight when pressurized fluid is injected in the chamber 48no.

The actuating stem 42, or shaft, is sized and shaped to fit in the cap channel 240, provided in the bottom cap 24no. In this variant of the actuator, the stem 42 extends from the main piston 34no. The actuating stem 42 can slide within the cap channel 240. A portion of the stem 42 extends outside of the bottom cap 24no. By extending outside of the bottom cap, it is meant that it goes beyond the bottom wall of the cap 24no, outside of the lowermost chamber. Similar to the normally closed actuator 20*nc*, the portion of the stem 42 extending outside the bottom cap 24*no* can be connected to a plunger of a valve, or to any other type of device requiring a linear motion. The other side of the stem 42 is directly connected to the main piston 34*no*, as it extends from it and is integrally part of the main piston 34*no*.

The biasing mechanism 33, in this case a wave spring, biases the piston 34*no* in the unactuated position. The biasing element 33 fits in a circular recess 242 provided in the bottom cap 24*no*. Of course, other type of biaising elements can be used. As best shown in FIG. 3C, when pressurized fluid is flown through the inlet 28, the first chamber 48*no* of the main actuating assembly 25*no* expands, moving the piston 34*no* from the unactuated to the actuated position. The biasing element 33 is thus compressed, allowing the actuating stem 42 to slide within the cap channel 240.

The first chamber 48*no* is limited by the top cap 22*no*. When the first chamber 48*no* expands, the second chamber 50*no* deflates, since the two chambers are contained in the fixed enclosure formed by the top and bottom caps 22*no*, 24*no*, which as screwed to one another, with threads 222, 244. The air or fluid contained in the second chamber 50*no* is expelled via the vent 30, provided in the bottom cap 24*no*.

Figure 4:
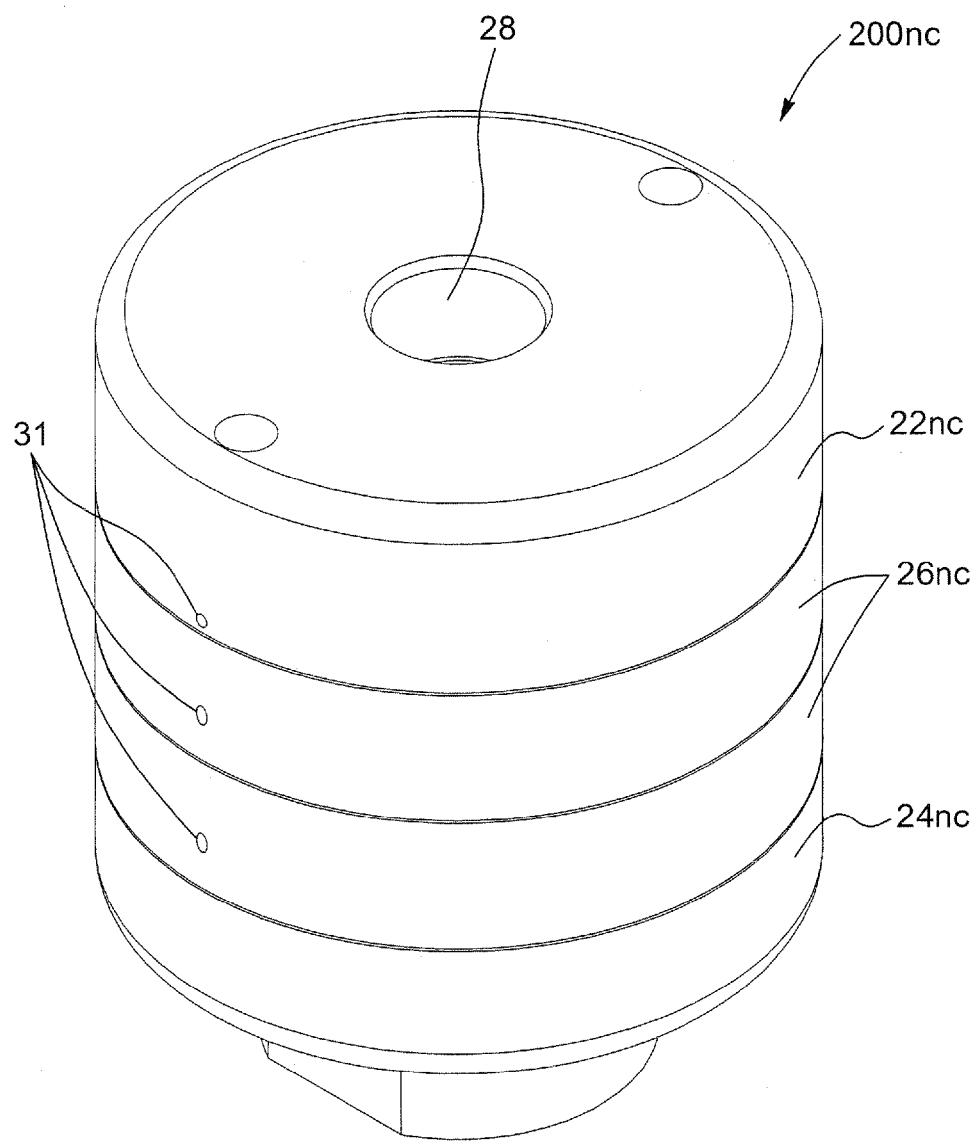
FIG. 4 is top perspective view of an actuator, according to a third preferred embodiment of the invention.

With reference to FIG. 4, an actuator 200*nc* according to another embodiment of the invention, is shown. This variant of the actuator is a normally closed actuator, and includes the first cap 22*nc*, two actuating cartridges 26*nc*, and the second cap 24*nc*. On the lateral wall of the top cap 22*nc* and the actuating cartridges 26 are cartridge outlets 31.

Figure 5A:
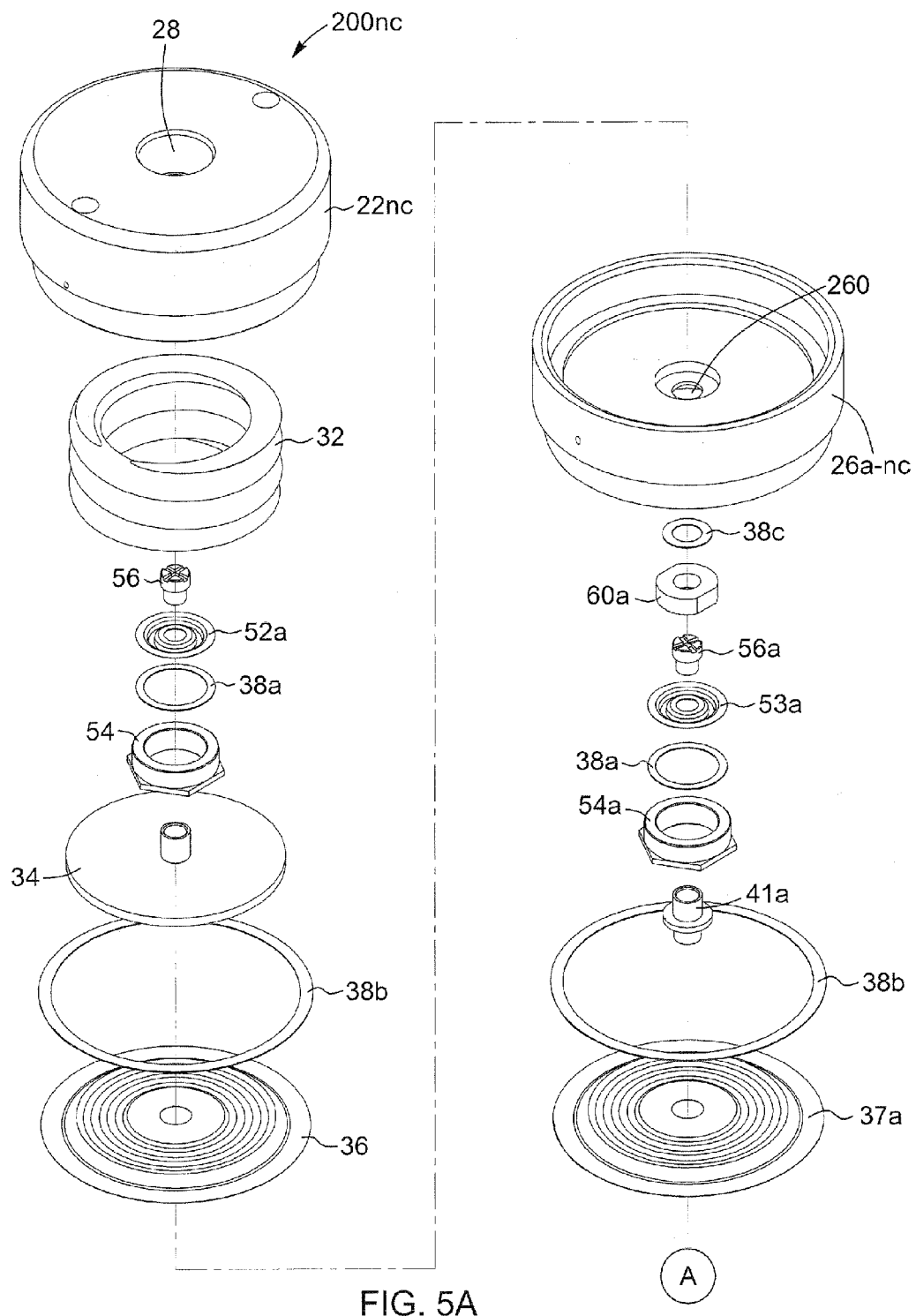
FIGS. 5A and 5B form an exploded view of the actuator of FIG. 4.
Figure 5B:
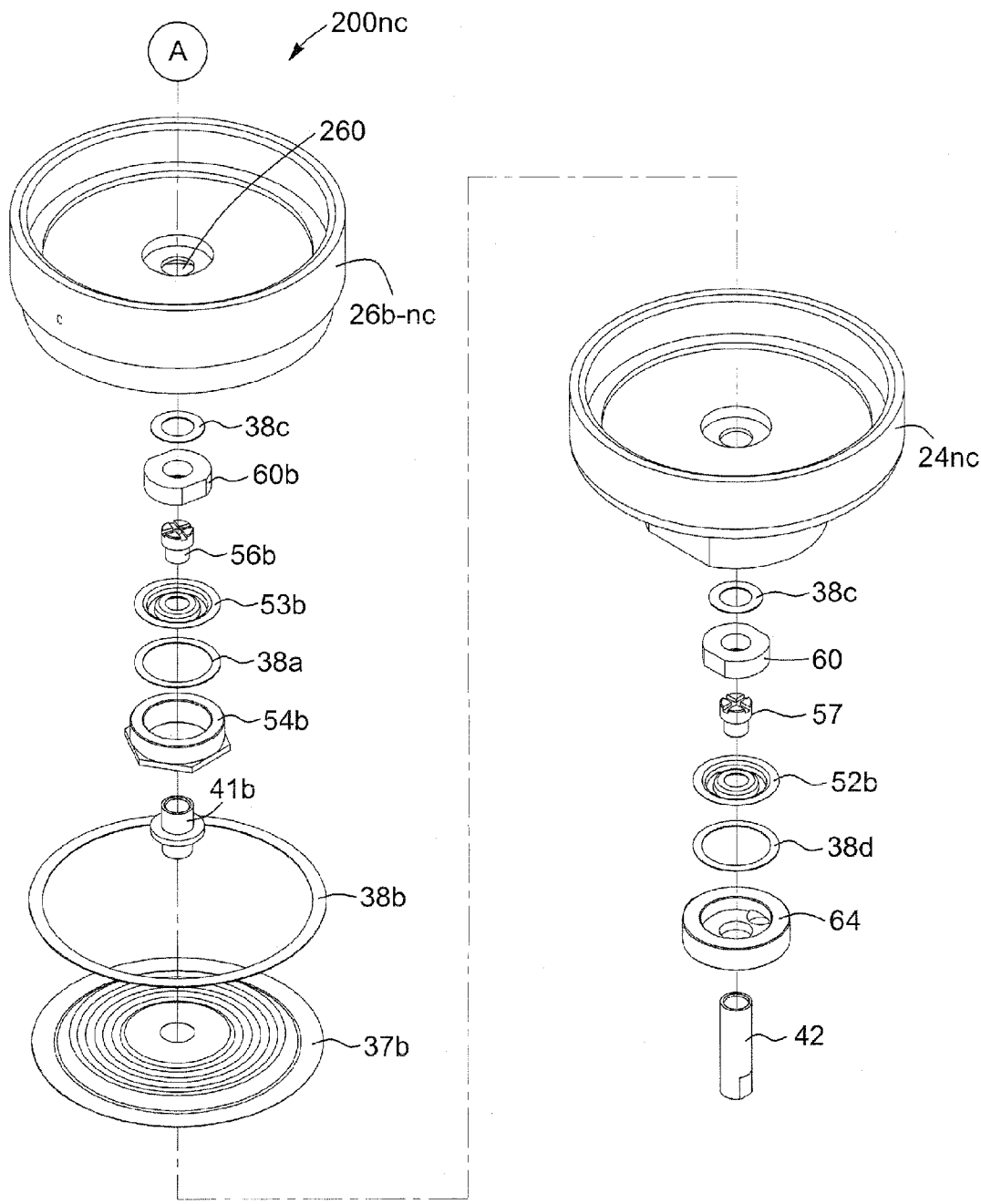
Figure 6:
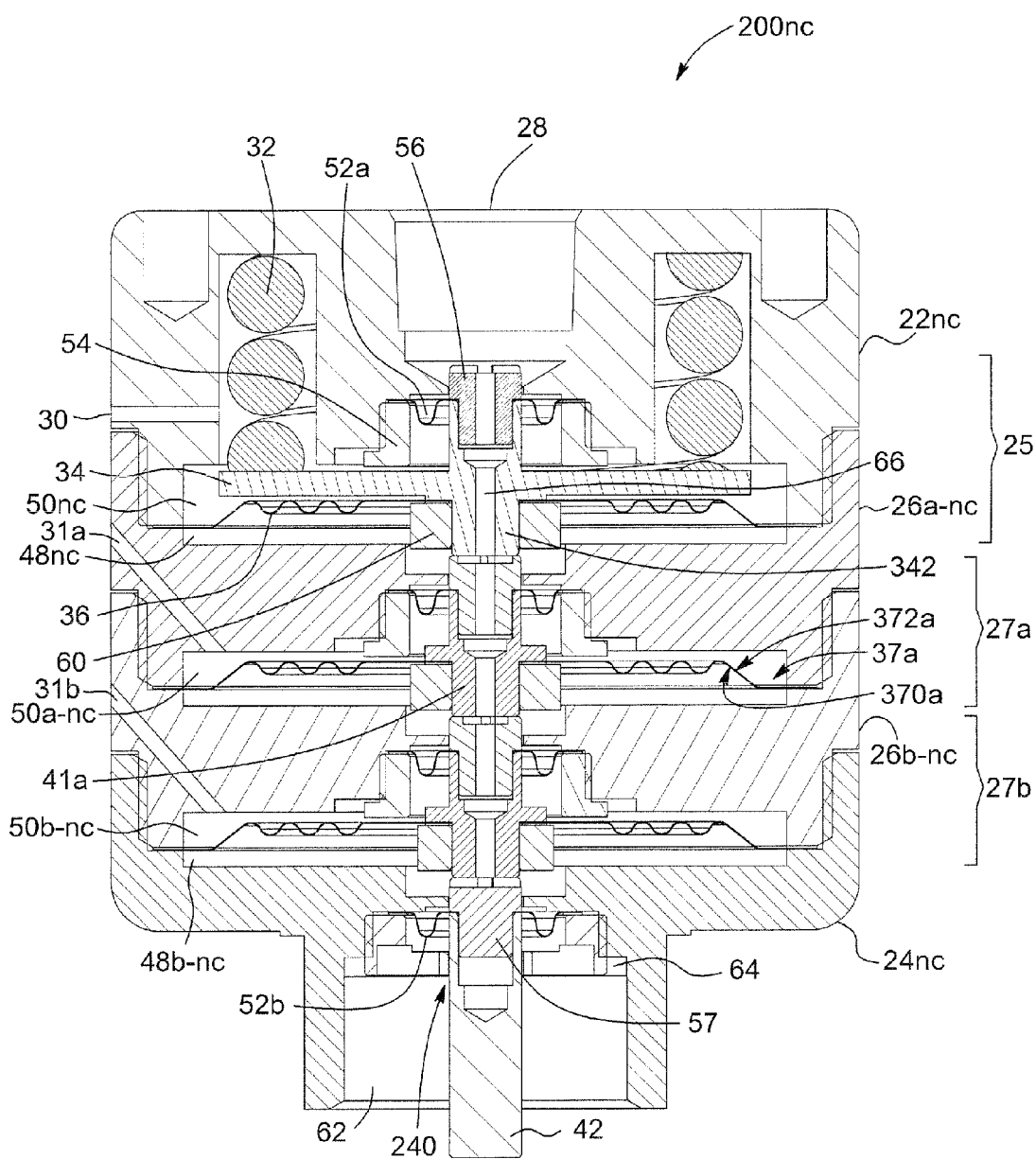
FIG. 6 is a cross-sectional view of the actuator of FIG. 4.

With references to FIGS. 5A, 5B and 6, the actuator 200*nc* includes two stackable secondary actuating assemblies 27, disposed between the first and second caps 22*nc*, 24*nc*. Each stackable assembly includes an actuating cartridge 26*nc*, an intermediate deformable diaphragm 37, first and second intermediate chambers 48*nc*, 50*nc*, an intermediate piston 41*nc*, and static sealing elements 38*a*, 38*b*, 38*c* and 38*d*. Of course, it is possible to insert a different number of stackable assemblies 27 between the top and bottoms caps, according to the weight-force one wishes to apply on the actuating stem 42.

Figure 9:
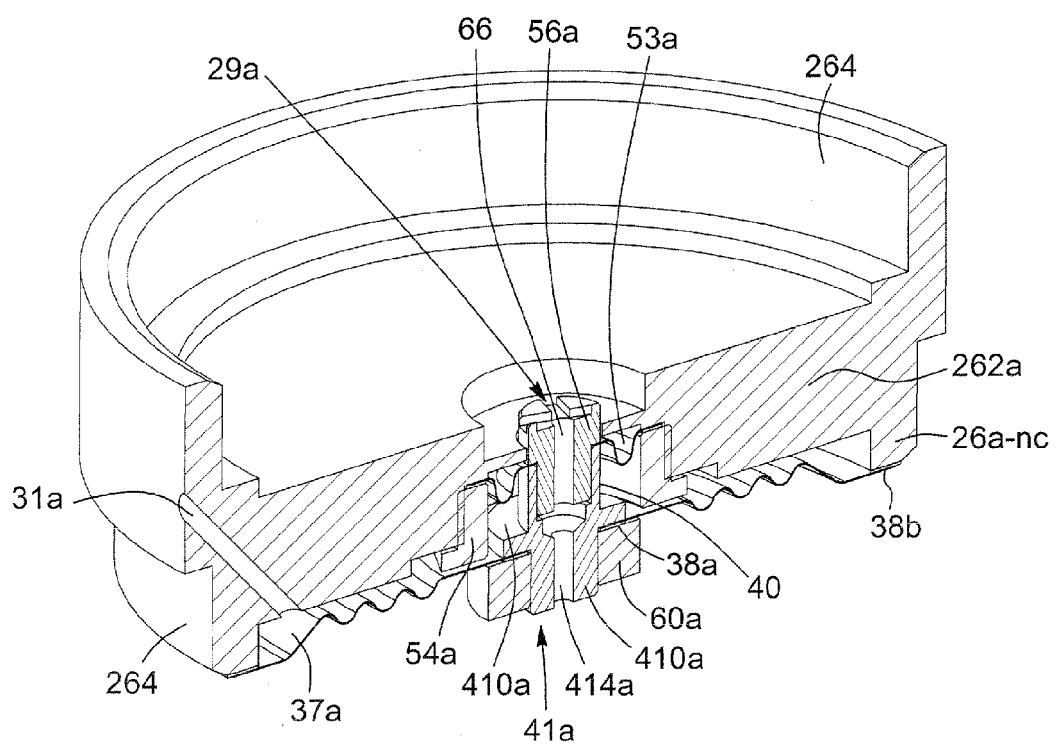
FIG. 9 is a cross-sectional perspective view of some of the components of a stackable secondary actuating assembly of the actuator of FIG. 4.
Figure 10:
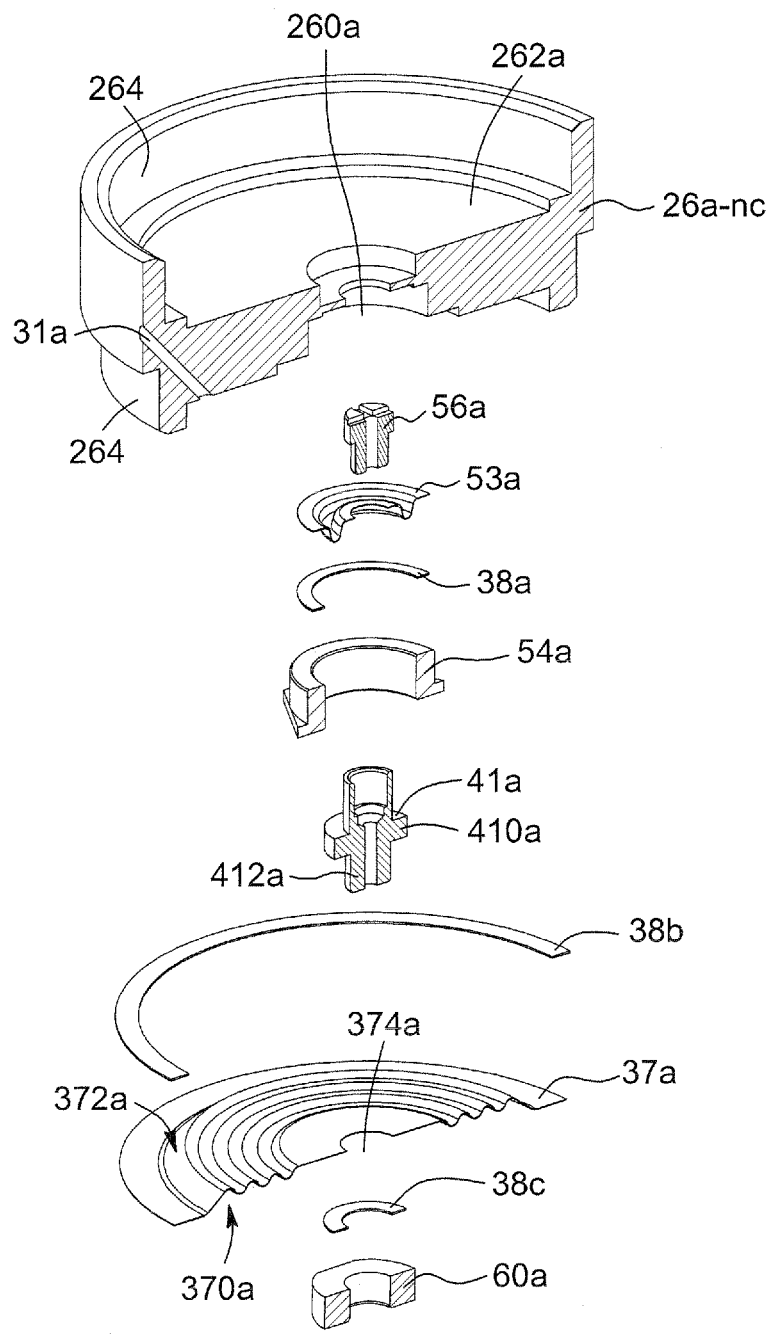
FIG. 10 is a cross-sectional exploded view of FIG. 9.

With reference to FIGS. 6, 9 and 10, the components of one of the two stackable assemblies will be described in more details. The other assembly has an identical configuration and comprising the same components. The actuating cartridge 26*a-nc* is provided with a cartridge channel 260*a* (identified in FIG. 10), for allowing pressurized fluid injected in the actuator to pass through it. The cartridge is to be used in combination with an intermediate deformable diaphragm 37*a*, having first and second surfaces 370*a*, 372*a*.

When in use, such as in FIG. 6, the stackable assembly 27*a* comprises a first intermediate chamber 48*a-nc*, which is limited by the first surface 370*a* of the intermediate diaphragm 37*a*. This first intermediate chamber 48*a-nc* is airtight and in fluid communication with inlet 28. As such, the cartridge inlet 29*a* is in fluid communication with the main inlet 28. Alternatively, it can also be considered to provide the first intermediate chamber with its own intermediate cartridge inlet, for example provided in the sidewall of the actuating cartridge. The assembly 27*a* also includes a second intermediate chamber 50*a-nc*, limited by the second surface 372*a* of the intermediate diaphragm 37*a*. The second intermediate chamber 50*a-nc* is in fluid communication with a cartridge outlet 31*a*, for expelling the fluid contained in the second chamber.

Still referring to FIGS. 6, 9 and 10, the assembly 27*a* includes an intermediate piston 41*a*, which is movable between the actuated and unactuated positions. The intermediate piston 41*a* includes a piston surface, which is part of a 410*a* which extends in the second chamber 50*a-nc*. The piston surface is operatively attached to a surface of the diaphragm, towards the center of the diaphragm. The intermediate piston 41*a* fits in the cartridge channel 260*a*, and operatively cooperates with the main piston 34*nc*. By "operatively cooperating", it is meant that the intermediate piston 41*a* is linked, either directly or indirectly, to the main piston 34*nc*. In the present case, the intermediate piston 41*a* is provided with an axial channel 414*a* extending through it. This channel 414*a* is in fluid communication with the main inlet 28 and with the first intermediate chamber 48*a-nc*. The intermediate piston 41*a* is linked to the main piston 34*nc* via the screw 56*a*. The intermediate piston 41*a* is connected to the screw 56*a* which also has an axial channel extending thought it. This axial channel of screw 56*a* is aligned with channel 414*a* of the intermediate piston 41*a*. The screw 56*a* allows to sealingly compress the second intermediate diaphragm 53*a* around its central hole, with the cartridge 26*a*. The head of screw 56*a* is in contact with the main piston 34*nc*, and is advantageously provided with a cross-shape groove, for facilitating the passage of the pressurized fluid in the first chamber 48*nc*. As it can be appreciated, the axial channel of the top cap 22*nc*, and the other screws 56 of the actuator are also provided with such cross-shape groove, for allowing the fluid to flow in the corresponding chambers.

Referring to FIG. 6, when pressurized fluid is flown trough the main inlet 28 and cartridge inlets 29*a*, 29*b*, the first intermediate chamber expands, deforming the intermediate diaphragm 37*a* and moving the intermediate piston 41*a* from the unactuated to the actuated position, the piston 41*a* sliding upwardly within the cartridge channel 260*a*, and assisting the compression of the biasing mechanism 32.

Still referring to FIG. 6, and also to FIG. 10, the intermediate diaphragm 37*a* is circular and provided with a central hole 374*a*. Also, the intermediate piston 41*a* has a first portion 412*a* extending in the first intermediate chamber 48*a-nc*, and has a diaphragm retaining nut 60*a* screwed onto it, for sealingly compressing the intermediate diaphragm 37*a* around the periphery of its central hole 370*a*, between nut 60*a* and the flange section 410*a*. The intermediate diaphragm 37*a* is also sealingly compressed along its outer periphery between the cartridge 26*a* and cartridge 26*b* of the lower stackable assembly with static sealing element 38*b*. Of course, in the case of assembly 27*b*, the outer periphery of intermediate diaphragm 37*a* is compressed between cartridge 26*b* and the bottom cap 24*nc*.

The cartridge 26*a-nc* is provided with threads 264 provided on its lateral wall, for engaging with adjacent caps and/or cartridges 26*nc*.

As shown in FIG. 6, the first intermediate chamber 48*a-nc* is limited by the second intermediate deformable diaphragm 53*b*. This second intermediate diaphragm 53*b* delimits said first intermediate chamber 48*a-nc* from an adjacent one of the chambers, and it allows movement of the intermediate piston 41*a* while keeping the first intermediate chamber 48*a-nc* airtight. Similarly, the second intermediate chamber 50*a-nc* is delimited by the second intermediate diaphragm 53*a*.

Referring to FIGS. 4-10, the diaphragms 36, 37, 52, 53 are each preferably made of a thin disc-shaped sheet having ripples to allow circulation of the actuating gas, but more importantly to provide it with adequate properties with regards to flexibility and deformability. The diaphragm can be made from polymer, elastomer, rubber, or metal, or from a combination of these elements. It can be filled or not. As explained earlier, bellow(s) can be used as diaphragm(s). In the case illustrated, each of the diaphragms is provided with a hole in its center, for receiving one of the pistons 34, 37 or of the screws 56. The respective inner rims of the diaphragms are affixed or snapped between the pistons 34, 41 and screws 56 and/or nuts 54, 60.

Metal gaskets 38 allows better sealing and avoids rotational force of the nuts 54, 60 to be transferred to the diaphragms 36, 37, 52, 53.

Still referring to FIGS. 4-10, the top cap 22nc, the bottom cap 24nc and each of the actuating cartridges 26a, 26b have a cylindrical shape and are each provided with a circular side wall. The sidewalls are respectively provided with threads for engaging with threads of the sidewall of an adjacent one of the bottom cap, top cap and actuating cartridge. Of course, it can also be considered to braze adjacent cartridges instead.

The two actuating cartridges 26a, 26b each has a radial wall delimiting first and second sections. As shown in FIG. 10, for cartridge 26a-nc, the radial wall 262a is provided with the axial channel 260a. Cartridge 26b-nc has an identical configuration. For each cartridge 26, the side walls of either one of the bottom section and top section includes one outlet, for example a vent, for expelling fluid. Still referring to FIG. 6, at the bottom portion of the actuator 200nc, the cap channel 240 receives the screw 57 and a diaphragm 52b maintained in place with a connecting and closing nut 64. The screw 57 is connected to the actuating stem 42, which is connectable to a plunger or to an auxiliary valve mechanism which is to be moved up and down by the actuator. The bottom cap 24 has a narrower portion provided with internal threads 62 designed for allowing a connection to another system, for example a diaphragm valve used in atomic layer deposition.

Figure 7:
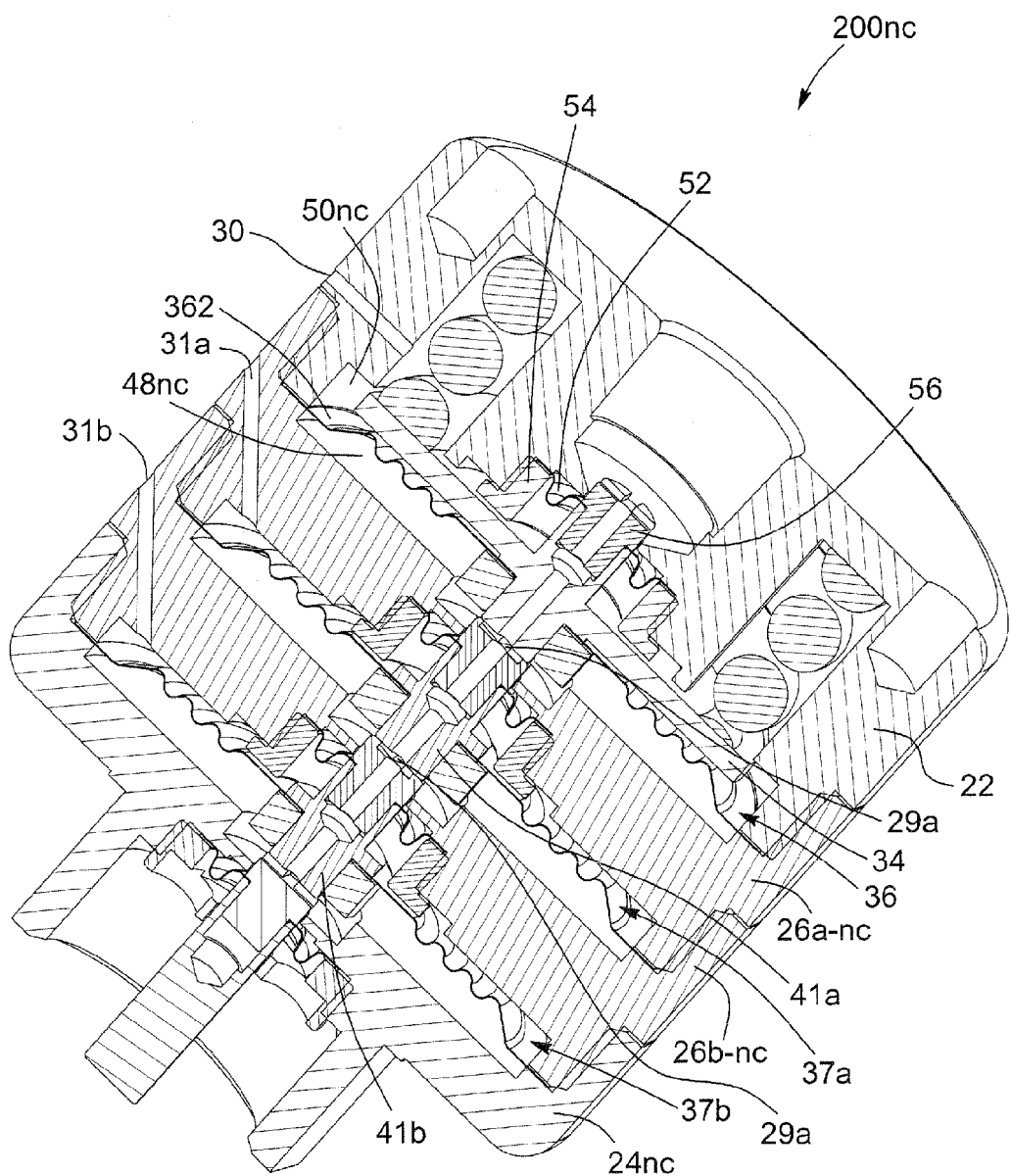
FIGS. 7 and 8 are top and bottom cross-sectional perspective views of the actuator of FIG. 4.
Figure 8:
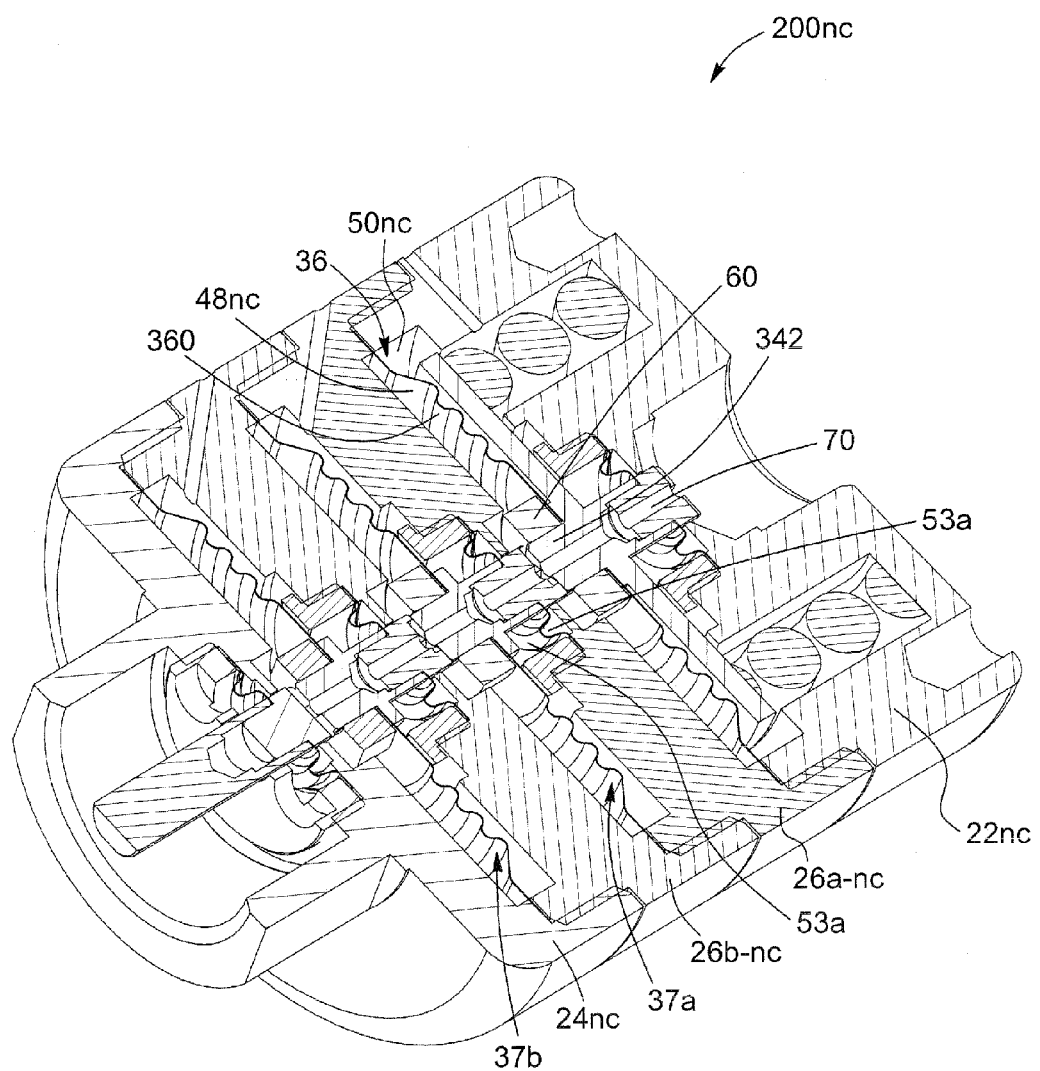

FIGS. 7 and 8 are respectively top and bottom perspective views of the cross-section of FIG. 6. They allow to better visualize the connections between the different elements of the actuating mechanism 200nc and how the diaphragms 36 defines first and second chambers 48nc, 50nc. As best seen in FIG. 7, the second chamber 50nc as an initial volume which is decreased when actuating fluid in injected in this normally closed mechanism 200nc, as it will be explained later. This second chamber 50nc is defined by the top surface 362 of the diaphragm 36, the inner surface of the top cap 22nc, the outside surfaces of the piston 34 and nut 54, and the bottom surface of the second diaphragm 52.

The first chamber 48nc is best seen in FIG. 8. This first chamber 48nc is defined by the bottom surface 360 of the diaphragm 36, the inner walls of the cartridge 26a, the lateral surface of the nut 60, and the top surface of the second diaphragm 53a. This chamber 48 will increase in volume when actuating gas is injected in the actuating mechanism 200nc. When several actuating cartridges 26 are used, first chambers of each cartridge communicate with each other through a fluid communication channel 70 passing along the central axis of the actuator.

Figure 11:
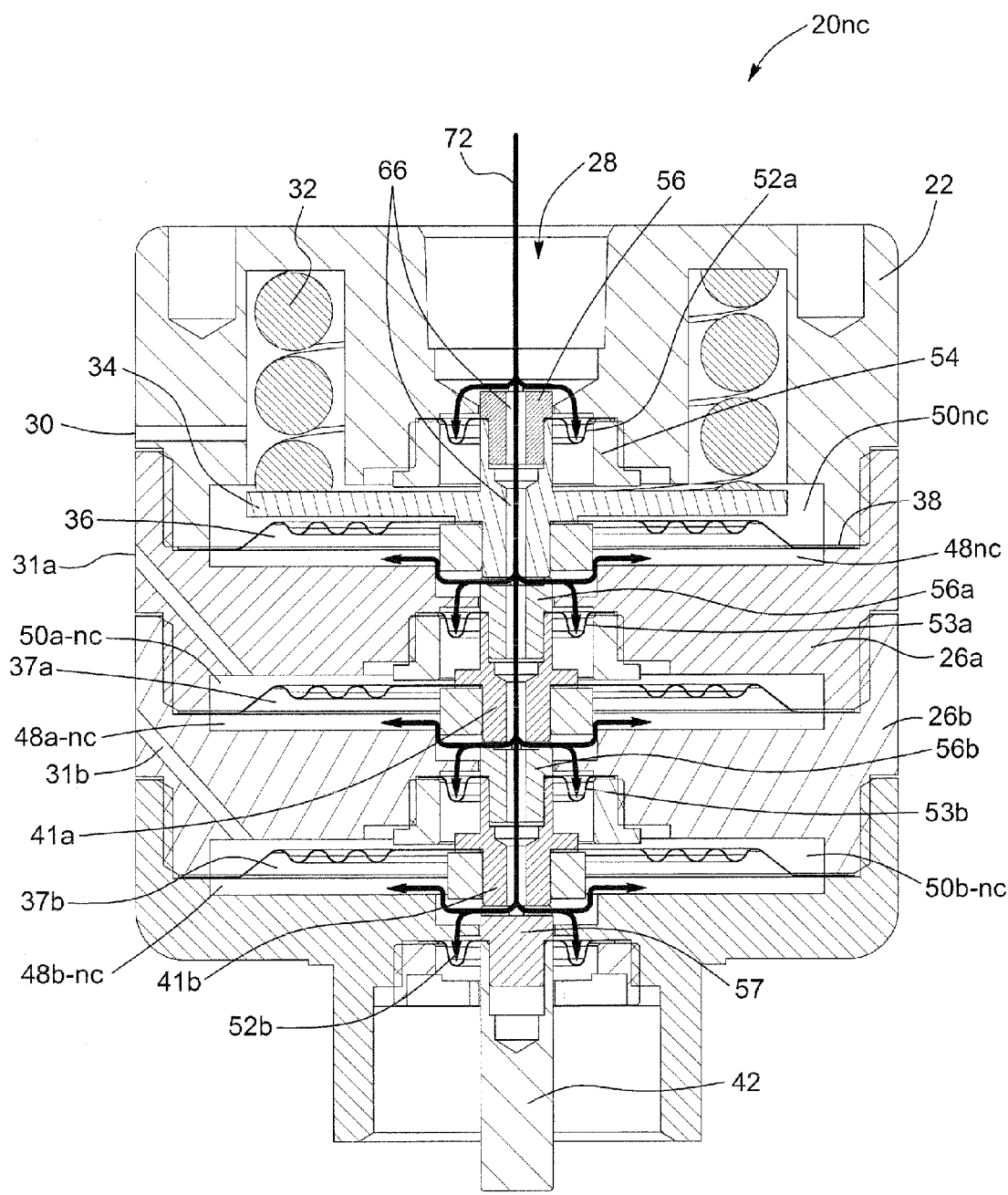
FIG. 11 is a cross-sectional view of the actuator of FIG. 4, showing the flow of pressurized fluid within the actuator.

Operation of the actuating mechanism 200nc will be explained with reference to FIG. 11. Pressurized fluid is injected within the actuator through the main inlet 28 of the top cap 22nc, and follows the path indicated by arrow 72. Because there is a small gap between the head of screw 56 and the inlet 28, some of the pressurized gas flows above the top surface of the diaphragm 52a. Most of the pressurized gas will be flown within the axial channel 66 of the screw 56, and then within the channel 66 of the main piston 34. The connection between the screw 56 and the upper portion of the piston 34 being airtight, the pressurized gas will be forced to exit at the opening located in the first portion of the piston 34 in the interstice defined between the lower most surface of the piston 34 and the upper most surface of the screw 56a.

Thanks to the cross-shaped groove made at the upper surface of the screw 56a, the pressurized gas will be directed towards the first chamber 48nc. This first chamber 48nc being airtight, thanks to the gasket 38b located between the top cap 22nc and the cartridge 26a, pressurized gas will inflate the first chamber 48nc, forcing the diaphragm 36 to deform, which in turn will push against the bottom face of the piston 34. The piston 34 will then move upwardly and its top face, in contact with the biasing element 32, will compress it from an extended to a compressed position. As several actuating cartridges 26 are used, the pressurized gas will continue its course throughout axial channels 66 of screw 56a and intermediate pistons 41a, and 41b, filling in subsequent first chambers 48a-nc, and 48b-nc.

Just as described above, the pressurized gas will exit below the bottom surface of the intermediate piston 41a, right above the top surface of the screw 56b, and will be forced into the first chamber 48a-nc, located below diaphragm 37a. The volume of the first chamber 48a-nc will increase, deforming the diaphragm 37a. The volume of the second chamber 50a-nc will decrease, air exiting through the vent 30a. The deformation of diaphragm 37a will cause the intermediate piston 41a to move upwardly, further assisting the compression on the biasing element 32. The same phenomenon will also occur in the actuating cartridge 26b, further increasing the force applied on the biasing element 32.

Thus, as one can appreciate, the use of several stackable secondary actuating assemblies allows applying a greater weight force on the biasing element 32 while using the same actuating pressure. The screws 56, 56a, 56b and 57, the piston 34 and the intermediate pistons 41a and 41b are all provided with axial bores or channels, which form a communicating channel 72 from the inlet 28 down to the last opening located between intermediate piston 41b and screw 57. The screw 57 is not provided with a bore. The lowermost screw 57 being connected to the shaft 42, the overall upward movement occurring within the actuator 200nc under the pressurized gas action will cause the shaft 42 to move from its unactuated position (normally closed) to the actuated position, in this case, from a downward to an upward position. The piston 41b can be connected directly to the screw 57, for example with threads or by soldering both elements 41b and 57 to one another, or alternatively a spring can be located below the stem 42, such as shown in FIG. 23B, forcing contact between the piston 41b and the screw 57. The second diaphragms 52a, 52b and 53a, 53b not only help defining the chambers, they also allow the actuating mechanism to move upwardly and downwardly within the actuator 200nc, thanks to their capacity to flex and deform. When the shaft 42 moves upwardly, the outer perimeter of each diaphragm 52a, 52b and 53a, 53b stays put between the connecting nuts and the wall of the caps or cartridges, and it is their portions that move up and down, following the vertical movement of the pistons 34, 41a, 41b. The grooves of the diaphragms facilitate their deformation.

Figure 12:
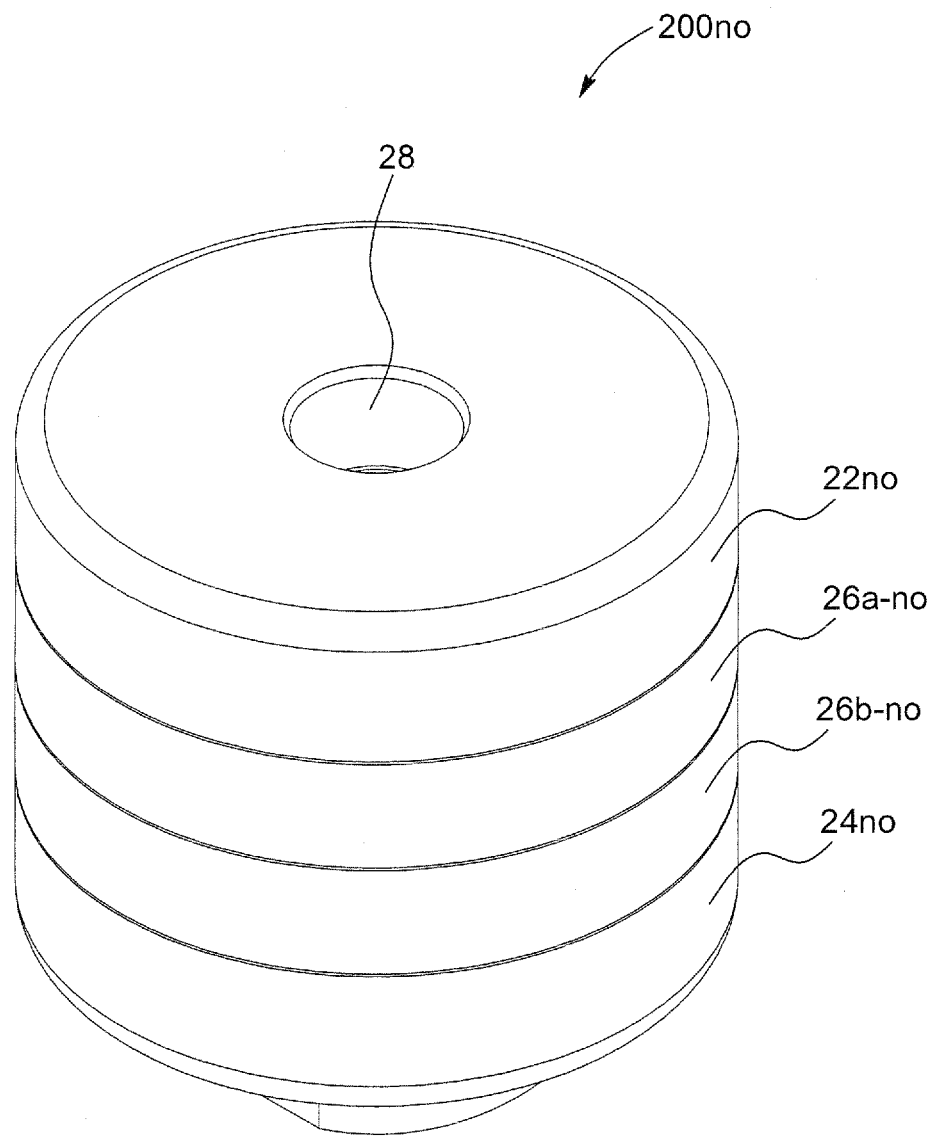
FIG. 12 is top perspective view of an actuator, according to a fourth preferred embodiment of the invention.

Now with reference to FIG. 12, another version of an actuator of the invention is shown. This version is a normally open actuator 200no, and comprises the top cap 22no, two actuating cartridges 26a-no, 26b-no, and the bottom cap 24no.

Figure 13A:
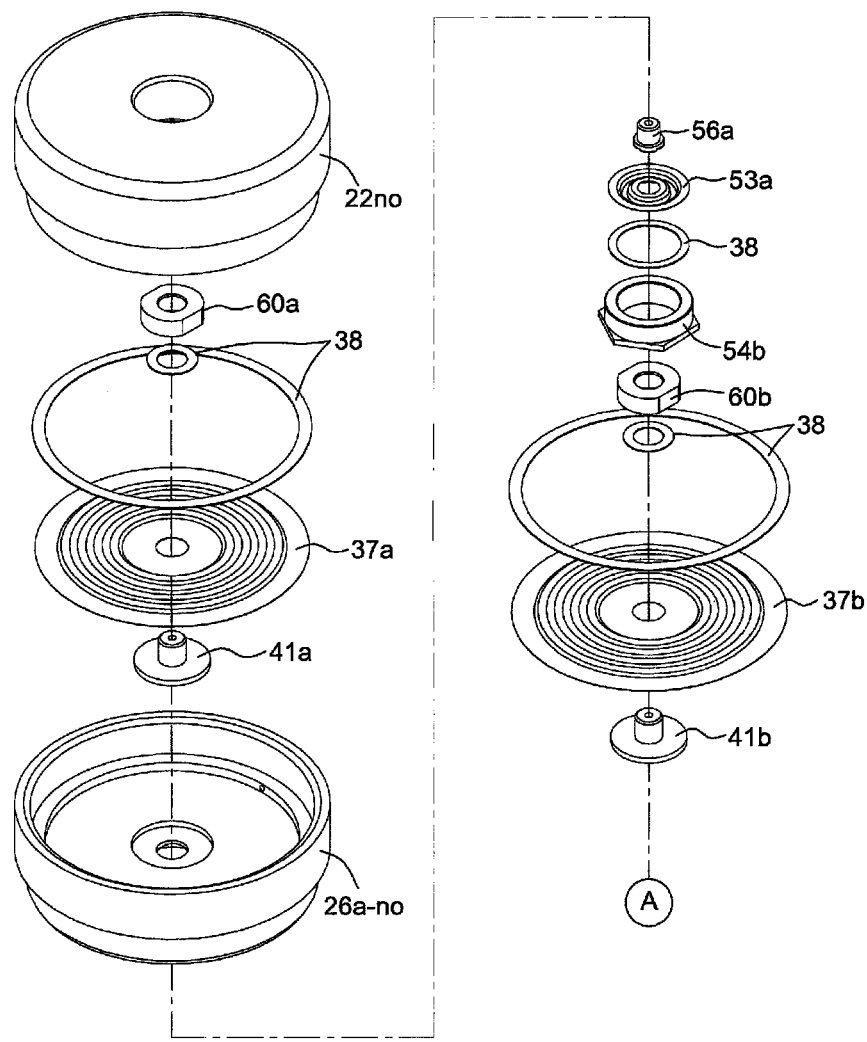
FIGS. 13A and 13B form an exploded view of the actuator of FIG. 12.
Figure 13B:
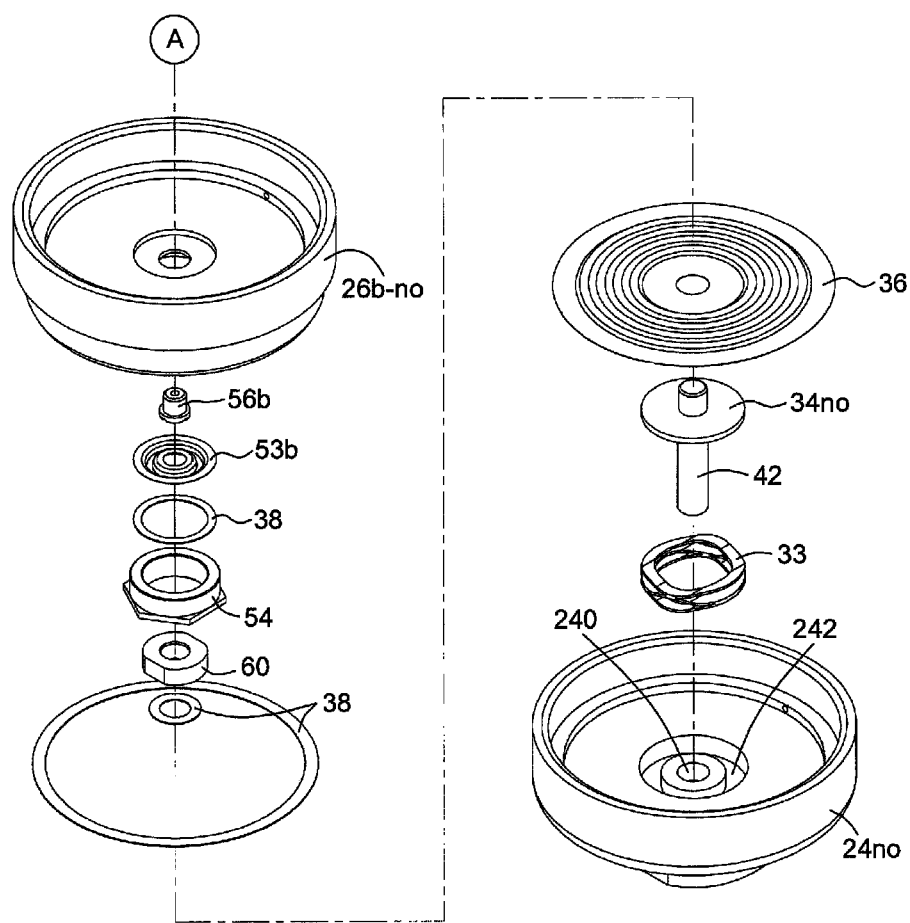

With reference to FIGS. 13A and 13B, the different elements or components of this normally open actuator 200no are shown. They are for the most part similar to the ones described for the normally closed mechanism, one of the main differences being that the biasing elements 33 are disposed within the bottom cap 24no rather than within the to cap, and preferably consists of Belleville washers or wave spring rather than one or more compression springs. The piston 34 is also formed integrally with the shaft 42, the biasing action of the wave spring 33 pressing against the flange section 340 of the piston 34 (best shown in FIG. 14), thus maintaining the shaft 42 in a normally open unactuating position.

Figure 14:
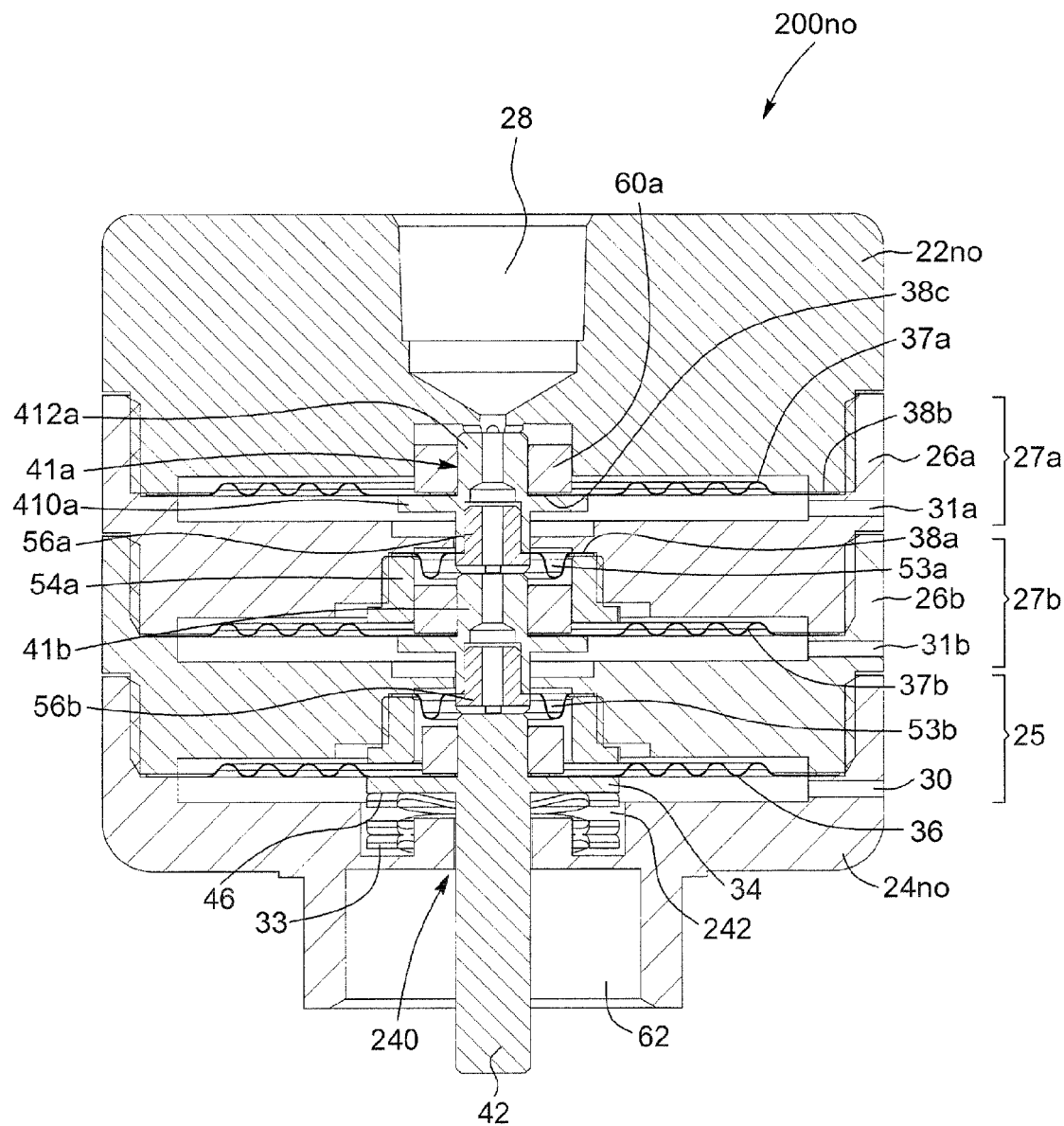
FIG. 14 is a cross-sectional view of the actuator of FIG. 12.
Figure 15:
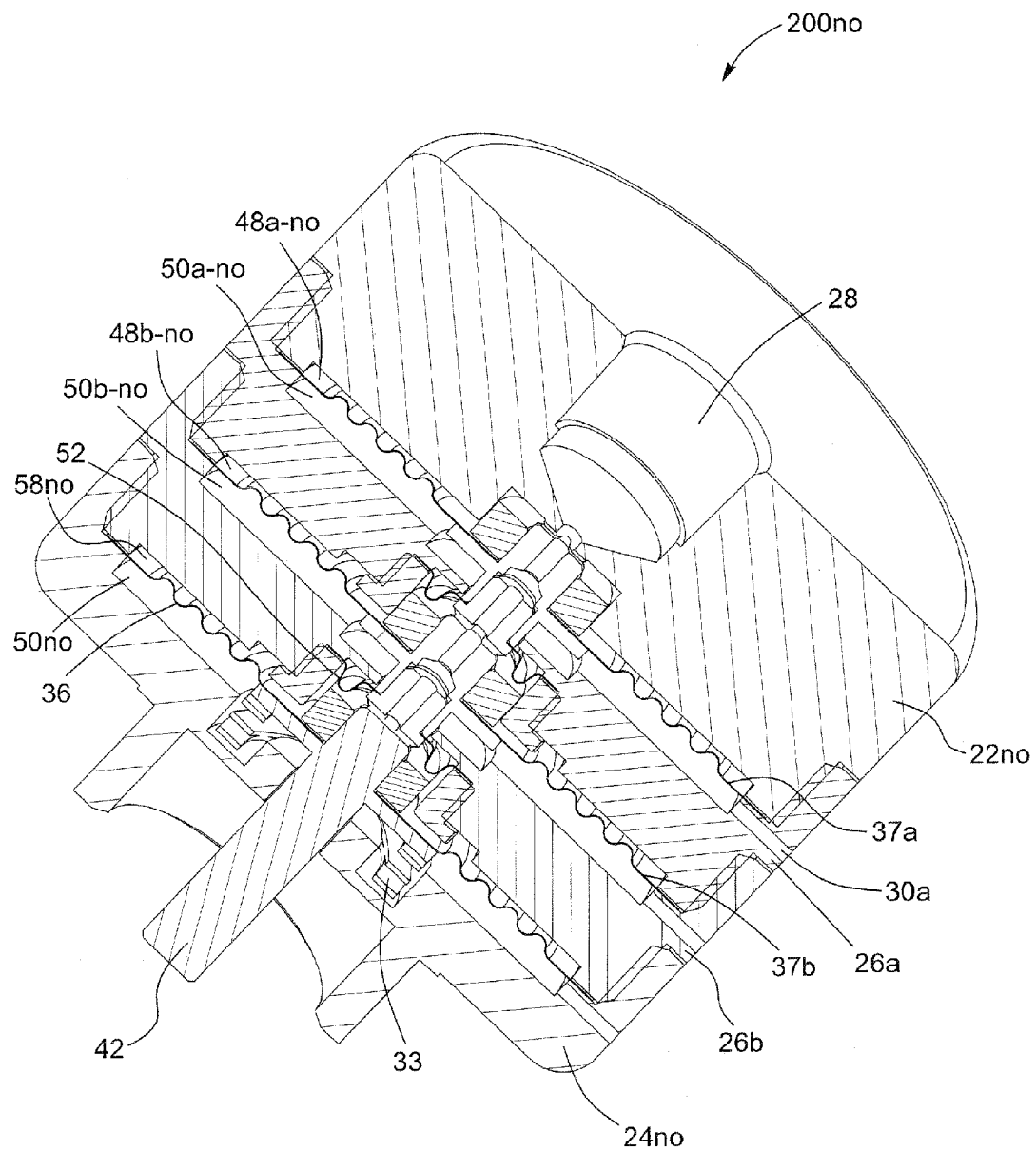
FIGS. 15 and 16 are top and bottom cross-sectional perspective views of the actuator of FIG. 12.
Figure 16:
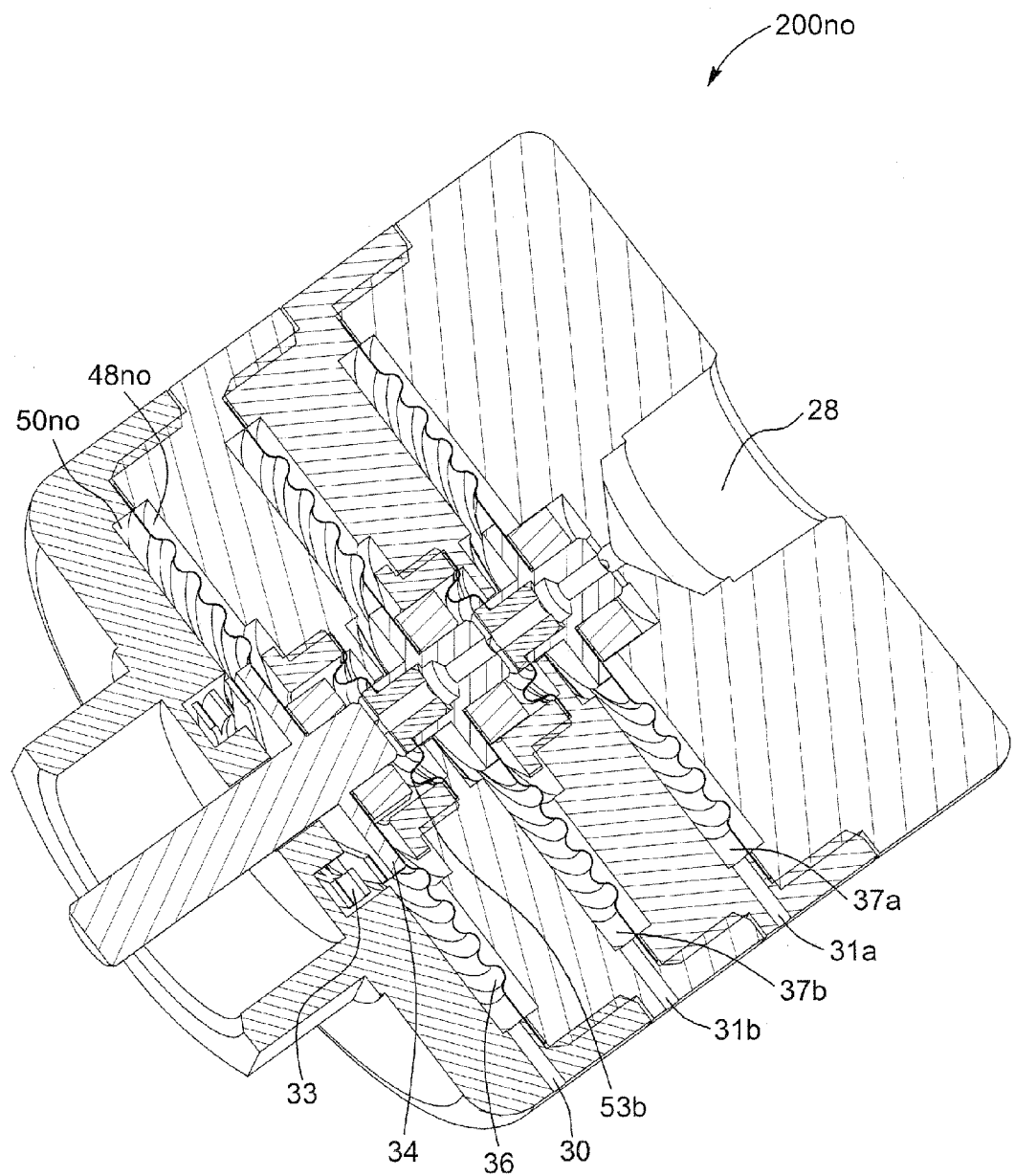

With reference to FIGS. 14-16, these two cross-section views allow to better visualize the connections between the different components of the actuator 200no, which include a main actuation assembly 25 and two stackable secondary actuating assemblies 27a, 27b. Mainly, the top cap 22no is provided with the inlet 28 for receiving a pressurized actuating gas. This inlet 28 is connected to a central bore, or axial channel 66, provided in the intermediate piston 41a, which is connected to screw 56a, also provided with an axial channel.

Disposed within the top cap 22no and the cartridge 26a is intermediate deformable diaphragm 37a. The intermediate diaphragm 37a is provided with grooves and has a central hole for receiving a first portion 412a of the intermediate piston 41a (identified in FIG. 14). The diaphragm 37a is sandwiched between nut 60a and the flange section 410a of the intermediate piston 41a. The connection is airtight, thanks to a gasket 38c. At the outer periphery of the diaphragm 37a, there is another gasket 38b for providing an airtight connection of the diaphragm 37a with the top cap 22no and the cartridge 26a. This gasket is also an anti-rotational device, which protects the diaphragm against its twisting when it is sandwiched.

Best shown in FIG. 15, the diaphragm 37a, together with the cartridge 26a, defines a second chamber 50a-no which can decrease in volume when pressurized gas is injected within the actuator 200no. Air present within the second chamber 50a-no can exit through the vent 30a when the diaphragm 37a is deformed under the action of the pressurized gas. A first chamber 48a-no is defined between the upper surface of the diaphragm 37a and the inner wall of the top cap 22no. FIG. 16 is another perspective view of the actuator of FIG. 15, which allow to better visualize the interrelation of the different components of actuator 200no. Cartridge 26b-no has a configuration similar to cartridge 26a-no.

Back to FIG. 14, a smaller diaphragm 52a is disposed within the first cartridge 26a, and sandwiched between the screw 56a and the lower portion of the intermediate piston 41a, at its center. Its outer periphery is sandwiched between cartridge 26a and nut 54a and the connection is airtight, thanks to the use of a gasket 38a. Similar components and connections are also present in the cartridge 26b-no, with diaphragm 53b for example. The biasing elements 33 are disposed within the circular recess 242 of the lower cap 24no. The biasing elements 33 are embodied, as described earlier, by a wave spring, which presses against the bottom face of the piston 34, forcing the shaft 42 upwardly in the unactuated, biased position (or open position). Just as for the normally closed actuating mechanism 200nc, the normally open mechanism 200no, the bottom cap 24no ends in a narrowing portion and is provided with internal threads 62 allowing the actuator 200no to be connected to another system. The shaft 42 can thus be connected to the plunger of such system, in order to close or open a valve.

Figure 17:
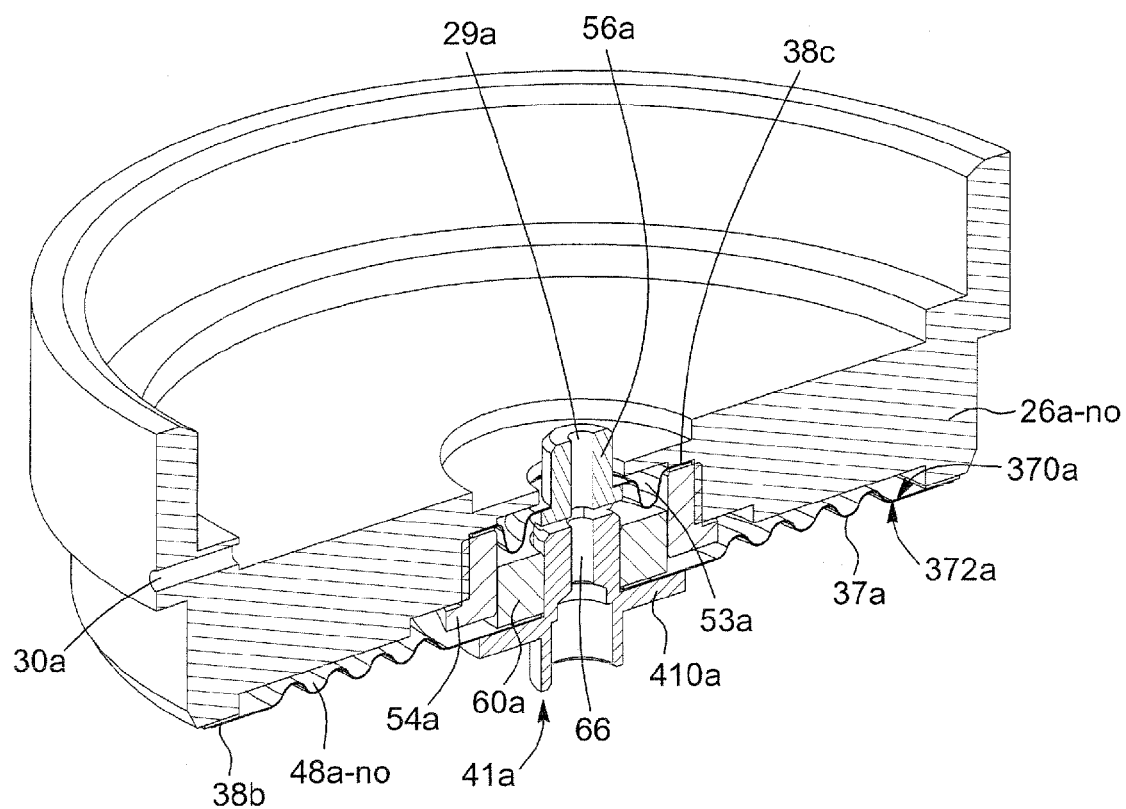
FIG. 17 is a cross-sectional perspective view of some of the components of a stackable secondary actuating assembly of the actuator of FIG. 12.
Figure 18:
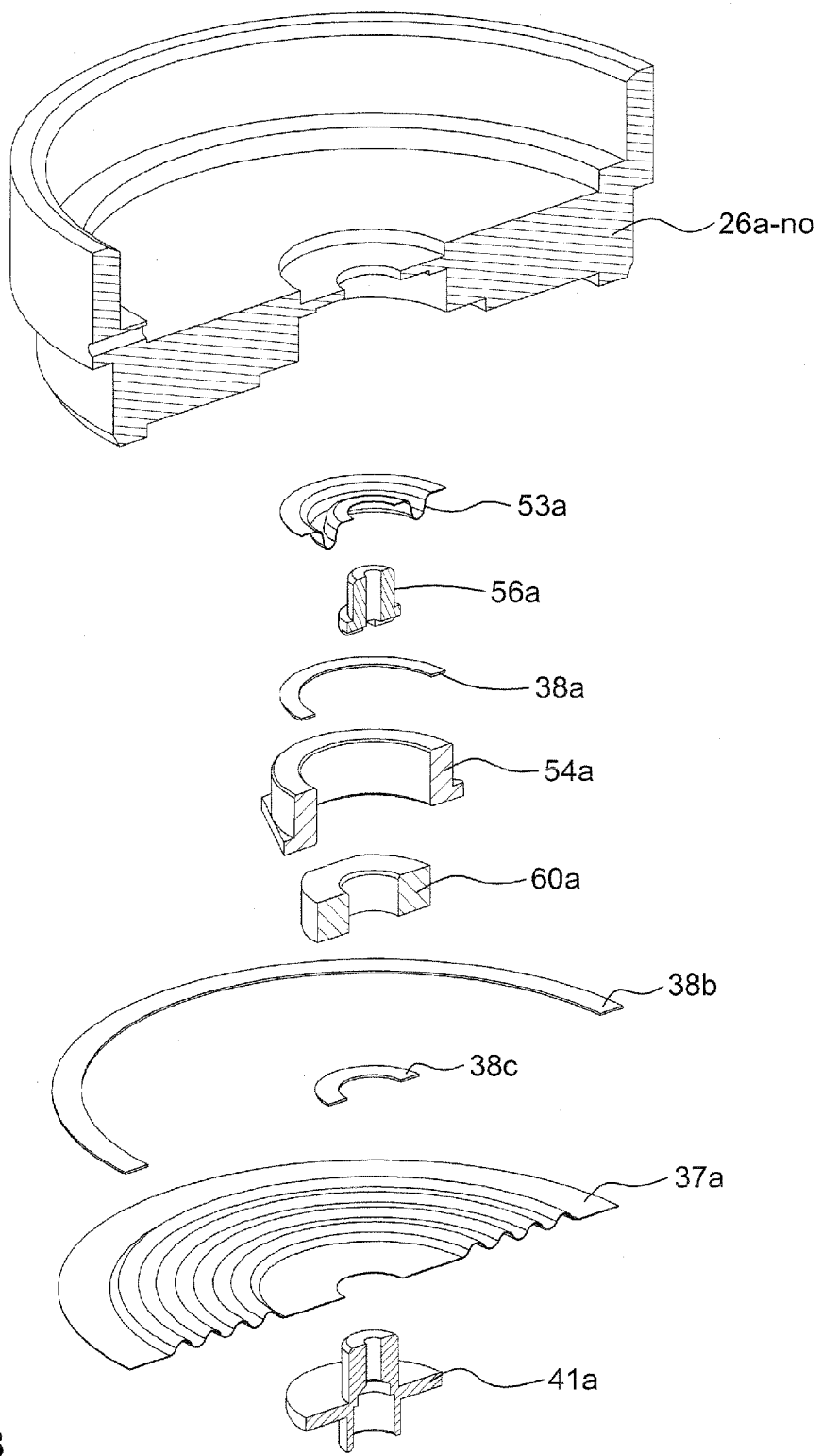
FIG. 18 is a cross-sectional exploded view of FIG. 17.

FIGS. 17 and 18 show the different components of one of the two stackable secondary actuating assemblies, for the normally open actuator 200no. Both the screw 56a and the intermediate piston 41a are provided with axial channels 66 to allow passage of the actuating gas. The first intermediate chamber 48a-no is limited by the first surface 370a of the intermediate diaphragm 37a. When in use, the first intermediate chamber 48a-no is airtight and in fluid communication with either one of the main inlet 28 of the actuator, provided in the top cap 22no, or with a cartridge inlet. When in use, a second intermediate chamber 50a-no (shown in FIG. 15) is created and limited by the second surface 372a of the intermediate diaphragm 37a. The cartridge 26-no is to be used with second diaphragm 53a, screw 56a, nuts 54a and 60a, intermediate diaphragm 37a and intermediate piston 41a, as well as with gaskets 38b and 38c.

Figure 19:
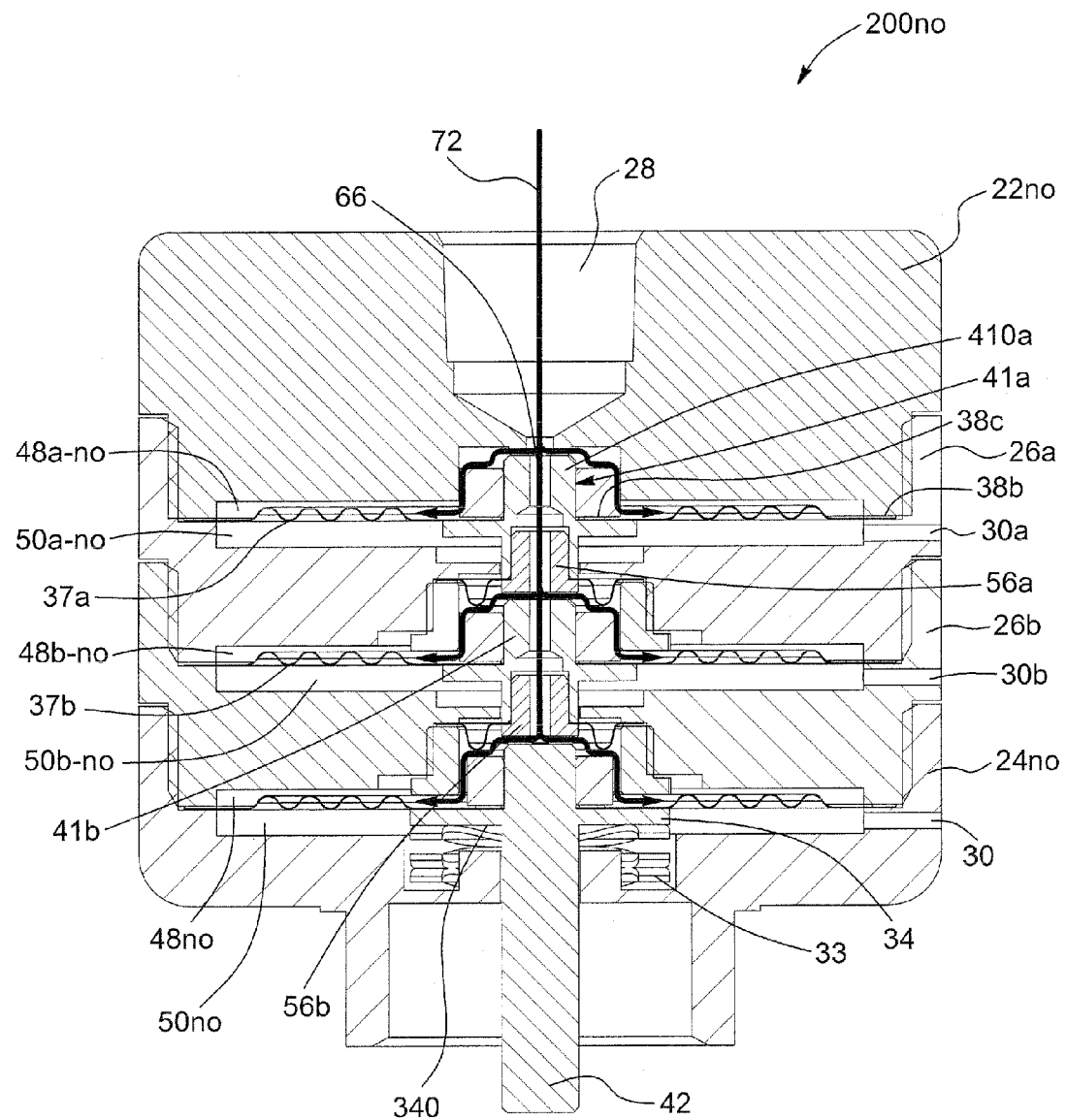
FIG. 19 is a cross-sectional view of the actuator of FIG. 12, showing the flow of pressurized fluid within the actuator.

Now with reference to FIG. 19, operation of the normally open actuator 200no will be explained. Pressurized gas is flown into the inlet 28 following the path 72, and gas will flow over the top surface of the first portion 410a of the intermediate plunger 41a towards the first chamber 48a-no, this chamber being airtight, thanks to the gaskets 38c, 38b. The volume of the chamber 48a-no will increase, thereby deforming the diaphragm 37a downwardly, causing in turn a downward movement of the intermediate plunger 41a. Gas contained in the second chamber 50a-no will be pushed outside the actuator 200no, exiting through the vent 30a. Pressurized gas will continue its course through the inner central bore 66 of screw 56a, exiting in the grooves of the head of screw 56a and the upper most surface of the intermediate plunger 41b. Again, pressurized gas will fill the first chamber 48b-no, causing the deformation of the diaphragm 37b, in turn pushing the intermediate plunger 41b downwardly. Air contained in the second chamber 50b-no will be pushed outside through the vent 30b. At the third stage of the actuator 200no, the pressurized gas will through the grooves of the head of screw 56b and upper most surface of the piston 34, filing in the first chamber 48no. The bottom face of the piston 34, in contact with the biasing element 33, will compress the biasing element 33, forcing the shaft 42 downwardly from the unactuated position (normally open) to the actuated position.

Figure 20:
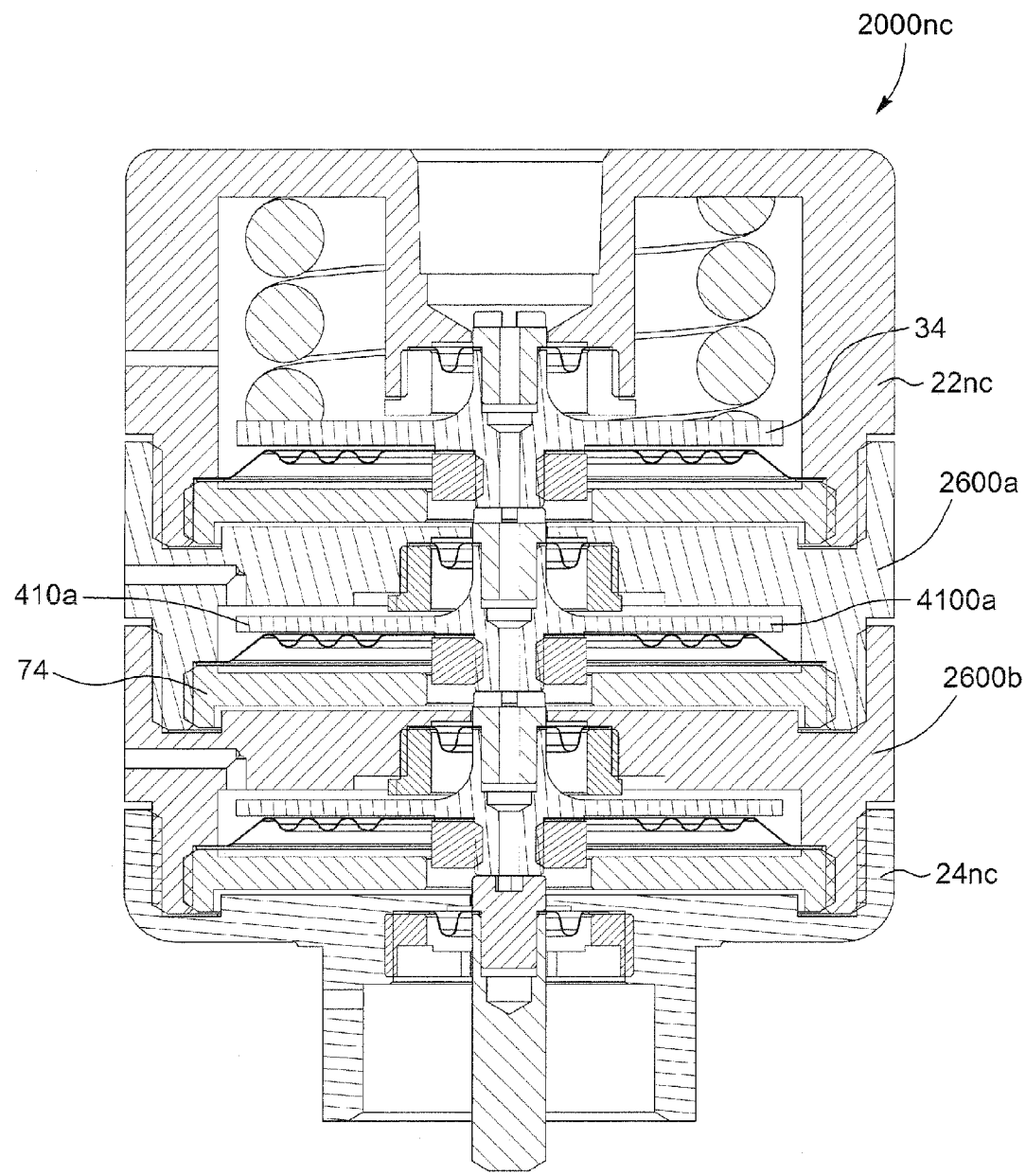
FIG. 20 is a cross-sectional view of an actuator, according to a fifth preferred embodiment of the invention.
Figure 21:
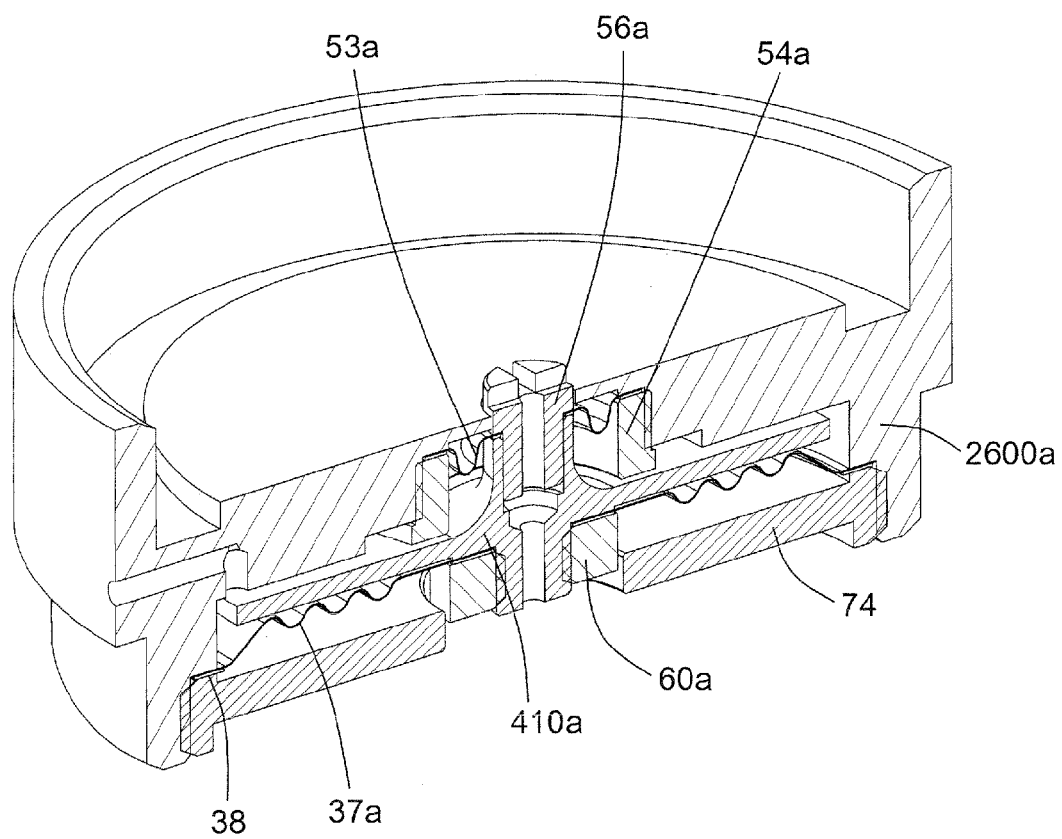
FIG. 21 is a cross-sectional perspective view of some of the components of a stackable secondary actuating assembly of the actuator of FIG. 20.
Figure 22:
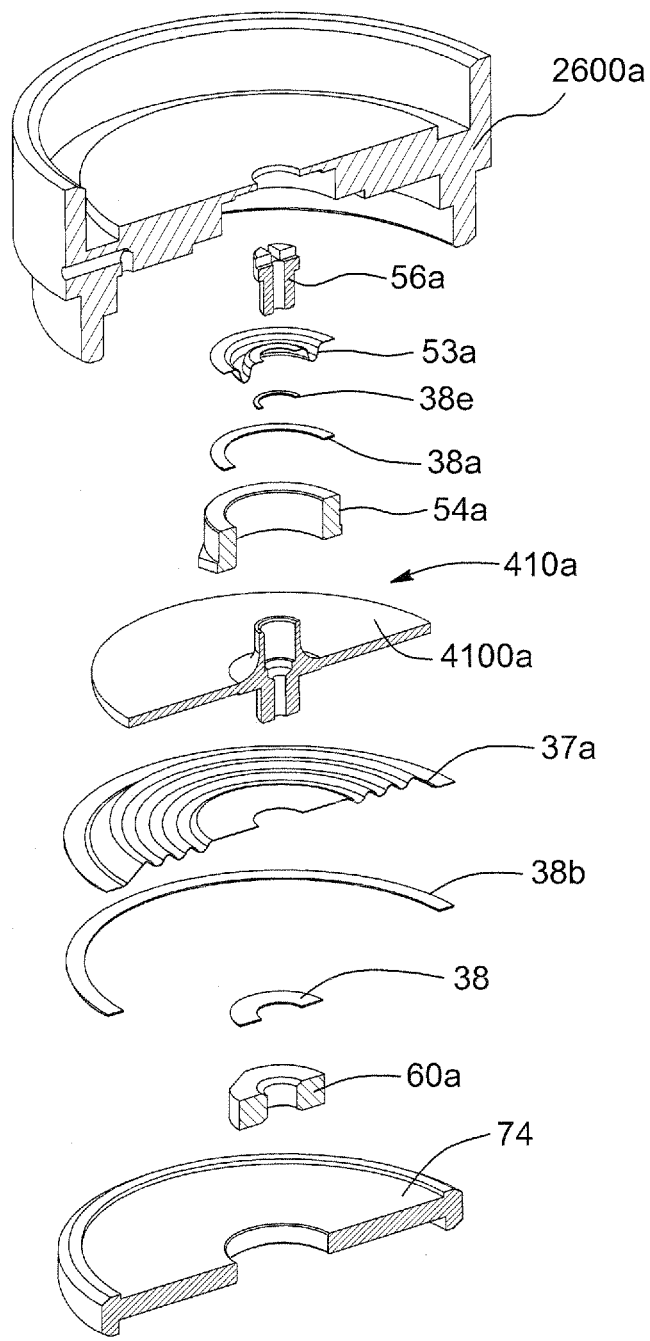
FIG. 22 is an exploded view of FIG. 21.

Referring now to FIGS. 20 to 22, another embodiment of an actuator of the invention is shown. Most of the components of this actuator 2000nc are similar to the ones from actuator 200nc, of FIG. 6. However, in this variant of the actuator, for each of the stackable secondary actuating assemblies, the flange section 4100a of the intermediate piston 410a and the flange of the main piston 34 have about the same diameter. In other words, intermediate pistons 410 have a larger diameter compared to the version shown in FIG. 6, and their respective diameters substantially correspond to the diameter of the flange section of piston 34. Providing the flange section of the intermediate piston 410 with a larger diameter allows distributing the pressure applied by the diaphragm 37a on the intermediate piston 410 when the first chamber is filled with pressurized gas. This embodiment also includes a protection disk 74, allowing protecting the diaphragm 37a of the stackable assembly, for example for packaging purposes. Indeed, since cartridges 26 can be packaged and sold separately, protection disks 74 allows protecting the intermediate diaphragms 37 which would otherwise be exposed when not in use. A protection disk can also be provided for the top and/or bottom caps 22, 24. When in use in an actuator, the disk 74 limits the first chamber of the corresponding assembly. Of course, the normally open actuator 200no can also include stackable secondary actuating assemblies in which the flange of the intermediate pistons is larger, similar to the main piston. The stackable assemblies can also include a protection disk, similar to the one shown in FIGS. 19-20.

Figure 23:
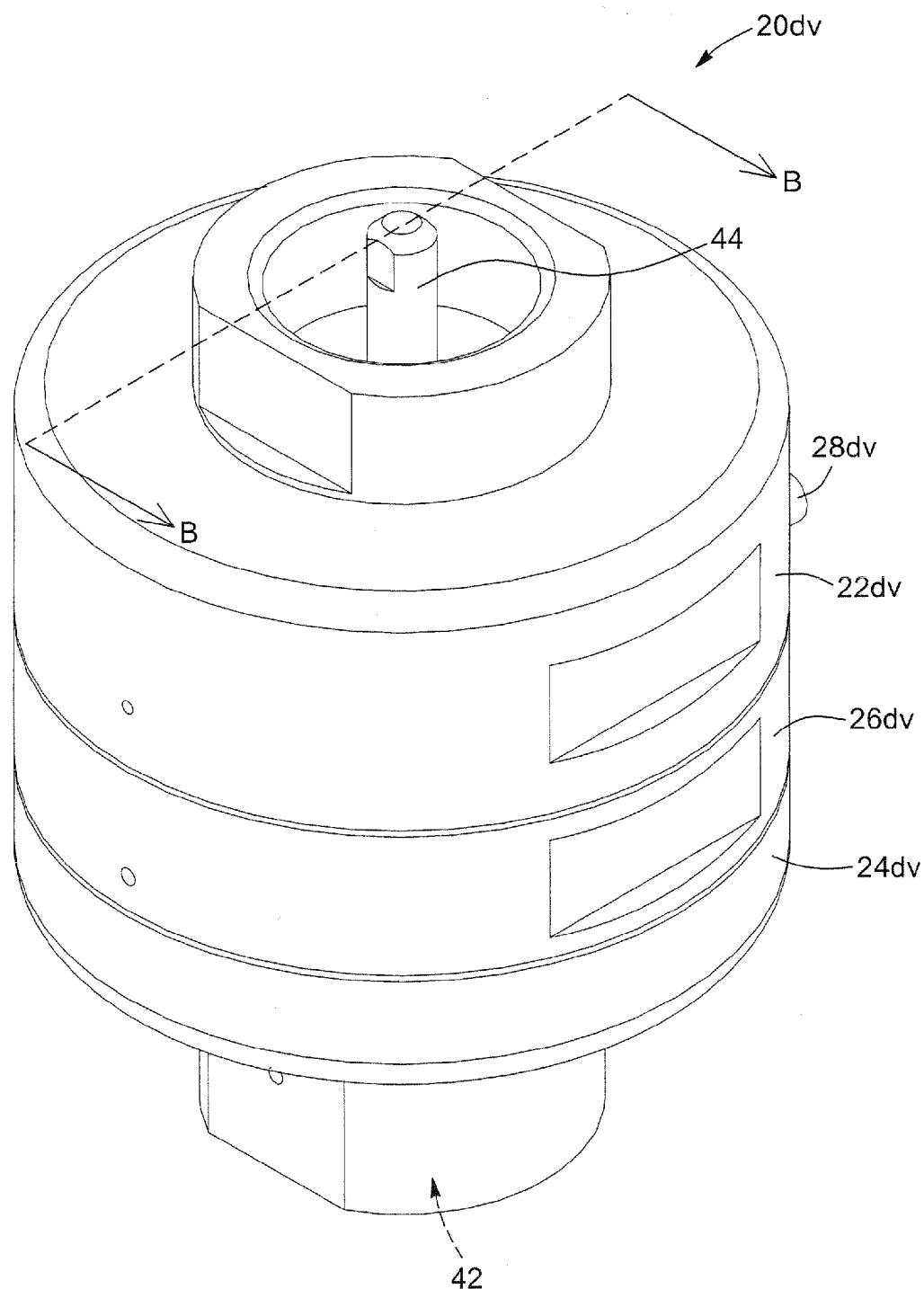
FIG. 23 is a top perspective view of an actuator, according to a sixth preferred embodiment of the invention.
Figure 23A:
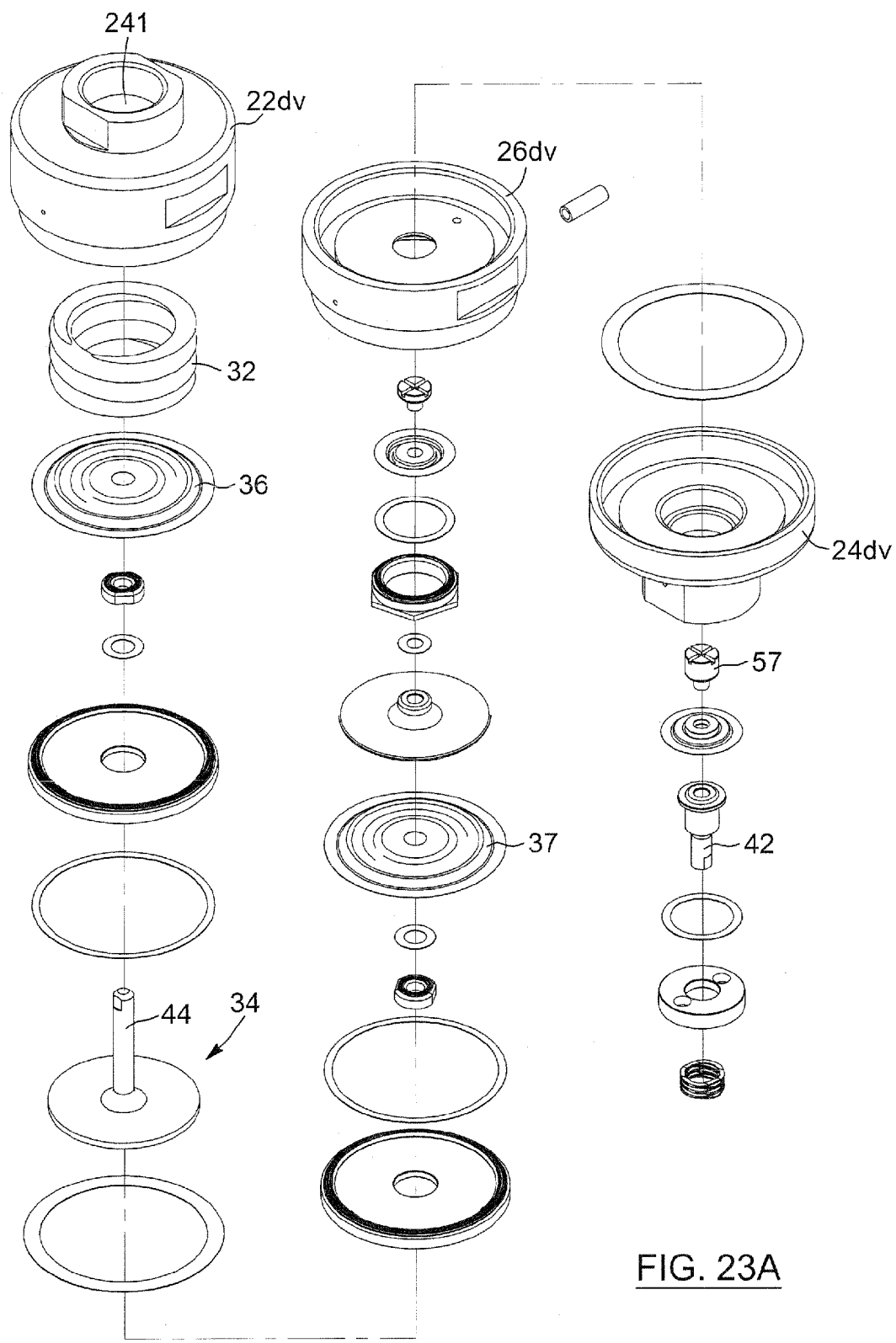
FIG. 23A is an exploded view of the actuator shown in FIG. 23.
Figure 23B:
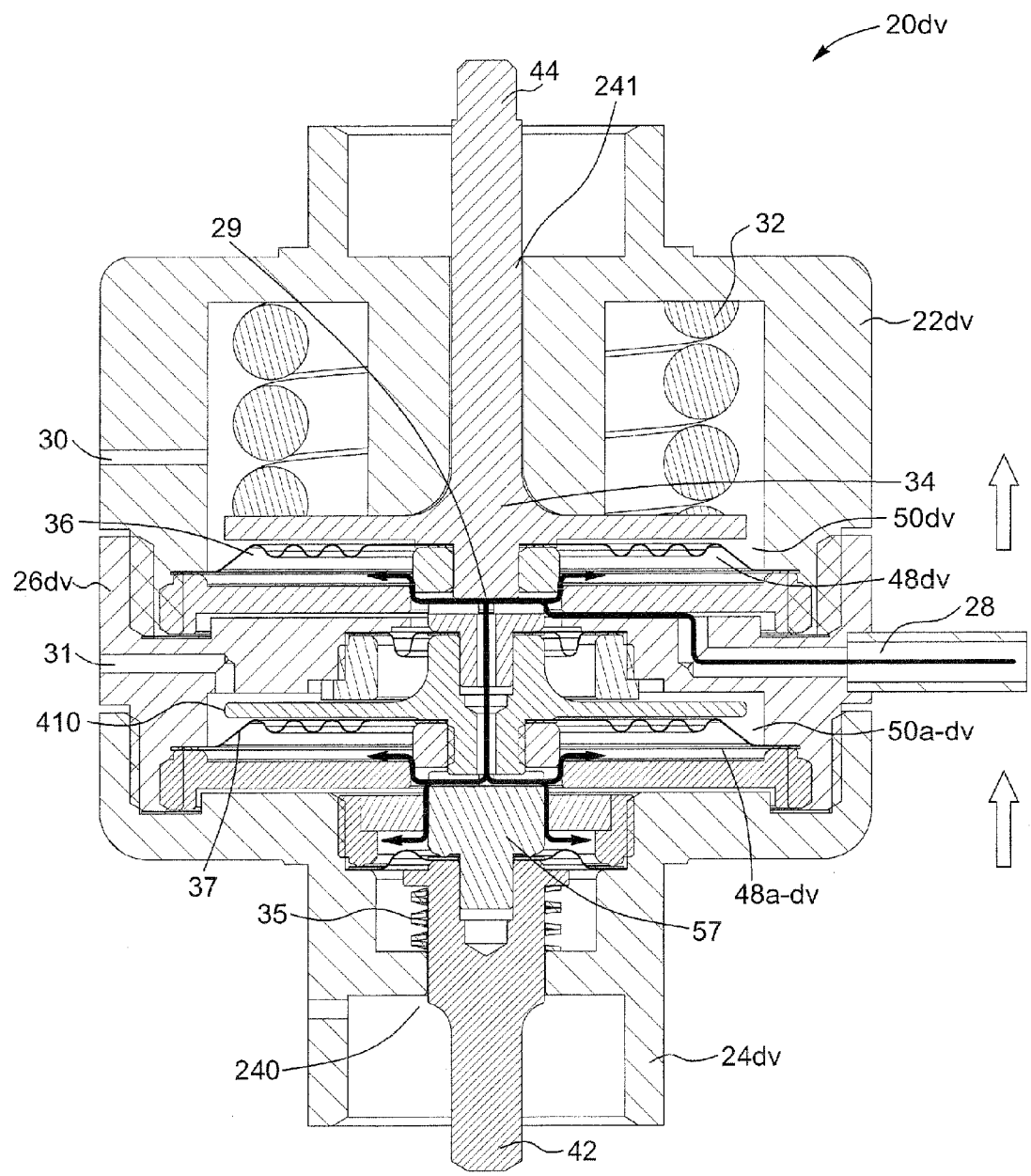
FIG. 23B is a cross-sectional view of the actuator of FIG. 23, taken along line B-B, showing the flow of pressurized fluid within the actuator.

With reference to FIGS. 23, 23A and 23B, another embodiment of the actuator according to the invention is shown. This actuator 20dv comprises a single stackable secondary actuating cartridge 26dv, disposed between the first and second caps 22dv, 24dv, and includes a second actuating stem 44 for actuating a second plunger, in addition to actuating stem 42. In the present case, the main inlet 28dv is provided in the stackable cartridge, rather than in one of the caps, contrary to other embodiments of the actuators previously described. The first cap 22dv and second cap 24dv are provided with respective cap channels 241, 240 (identified in FIGS. 23A and B). The second actuating stem 44 slidably fits in the second cap channel 241 and a portion of the second stem 44 extends outside the second cap 22dv. The second actuating stem 44 slides within the cap channel 241 when the main piston 34 moves between actuated and unactuated positions. The second actuating stem 44 can be connected or integrally part of the main piston 34, as in the present case. It can also be considered to provide a double-stem actuator in which the stems move in opposite directions. In this case a fluid tight plate is placed across the actuator, thus creating a double-actuator. Referring to FIG. 23B, when actuator 20dv is unactuated, biasing element 32 presses the main piston 34 and the intermediate piston 410, maintaining them in their unactuated positions. In the present case, the biasing element 32 pushes the main piston 34 and intermediate piston 410 downwardly, the actuating stem 44 being retracted towards the first cap 22dv.

For actuating the actuator, pressurized fluid is flown through main inlet 28, which is in fluid communication with cartridge inlet 29. The pressurized fluid fills the first chamber 48dv and the first intermediate chamber 48a-dv, thereby deforming the diaphragms 36, 37, which will in turn move the main piston 34 and intermediate piston 410. In the present case, the main piston 34 and intermediate piston 410 are move upwardly, compressing the biasing element 32. Since the main piston 34 moves upwardly, and the second actuating stem 44 is connected to it, the actuating stem 44 will move upwardly as indicated by the uppermost arrow on the right side of the drawing.

By compressing the biasing element 32, pressure will be removed from the actuating stem 42, allowing it to move from a lowered to a raised position. Preferably, biasing elements 35, in this case a wave spring, further assist the actuating stem 42 to move from the actuated to the non-actuated position, and in this case, from a lowered to a raised position, the biasing element 32 having a stronger biasing force than biasing element 35. As the first chambers 48dv,48a-dv expend, the second chambers 50dv,50a-dv deflate and fluid is expelled from the main outlet 30 and the cartridge outlet 31.

Of course, it is possible to control movement of the actuating stems 42, 44 by modifying or adjusting the biaising forces of the respective biasing elements 32, 35, and by controlling the pressure of the fluid injected through the main inlet 28dv.

It can also be considered to retrieve the biasing spring 32 and to replace it with a controllable source of pressurized fluid which would, when the actuator is in the unactuated position, perform the same task as the biasing element 32, which consists in forcing the main piston 34 in the unactuated position (for example downwardly). When actuated, the controllable source depressurizes the hollow portion of cap 22dv, creating a vacuum which would accelerate deflation of second chamber 48dv. Similarly, in order to increase the actuating speed of the actuator, it can be considered to connect the outlet 31 of the stackable secondary actuating cartridges to a vacuum source.

As such, the biasing mechanism of the actuator of the present invention can be a controlled source of pressurized fluid, for biasing the main piston 34 in its unactuated position.

Figure 24:
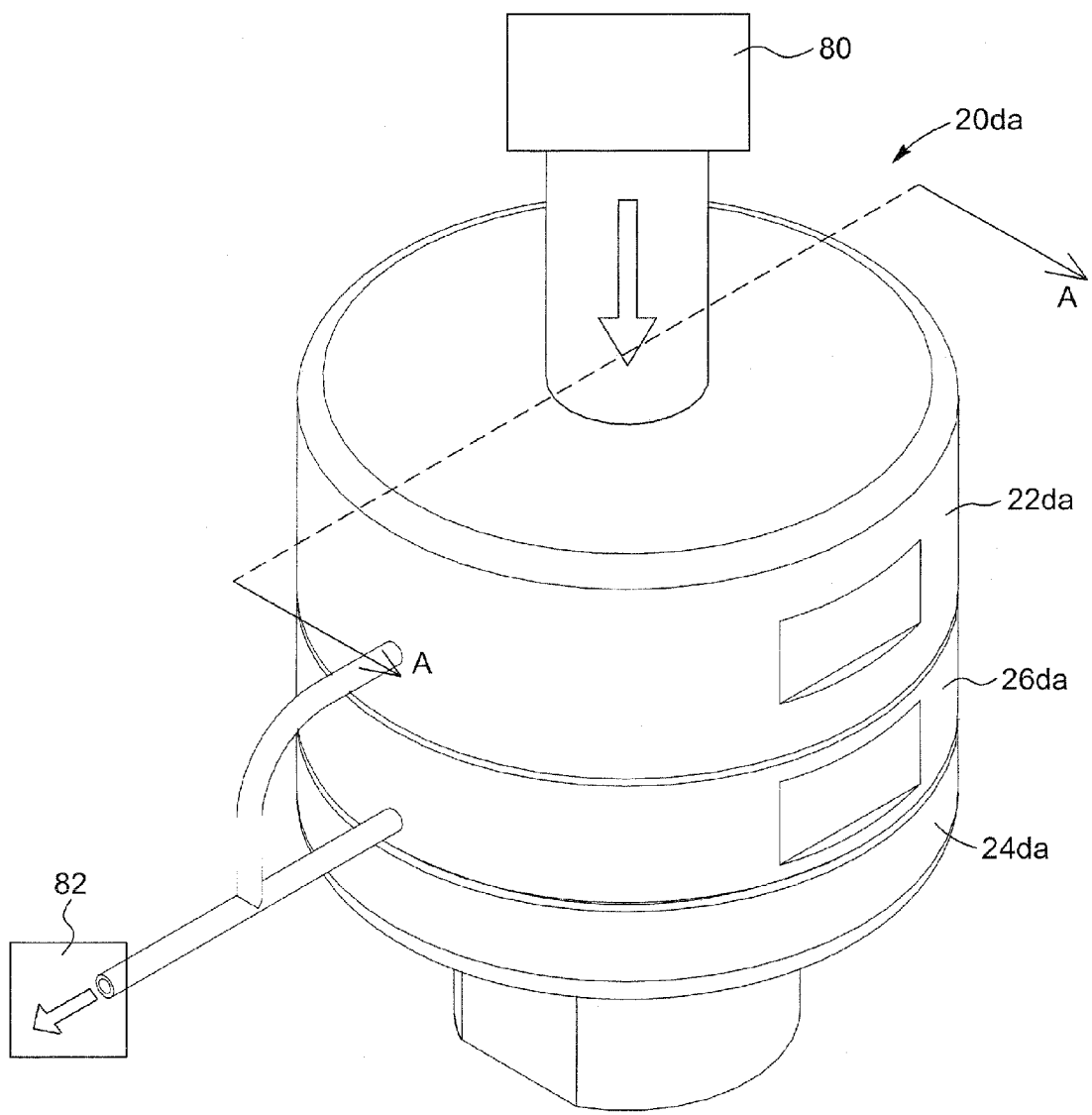
FIG. 24 is a top perspective view of an actuator, according to a seventh preferred embodiment of the invention.
Figure 24A:
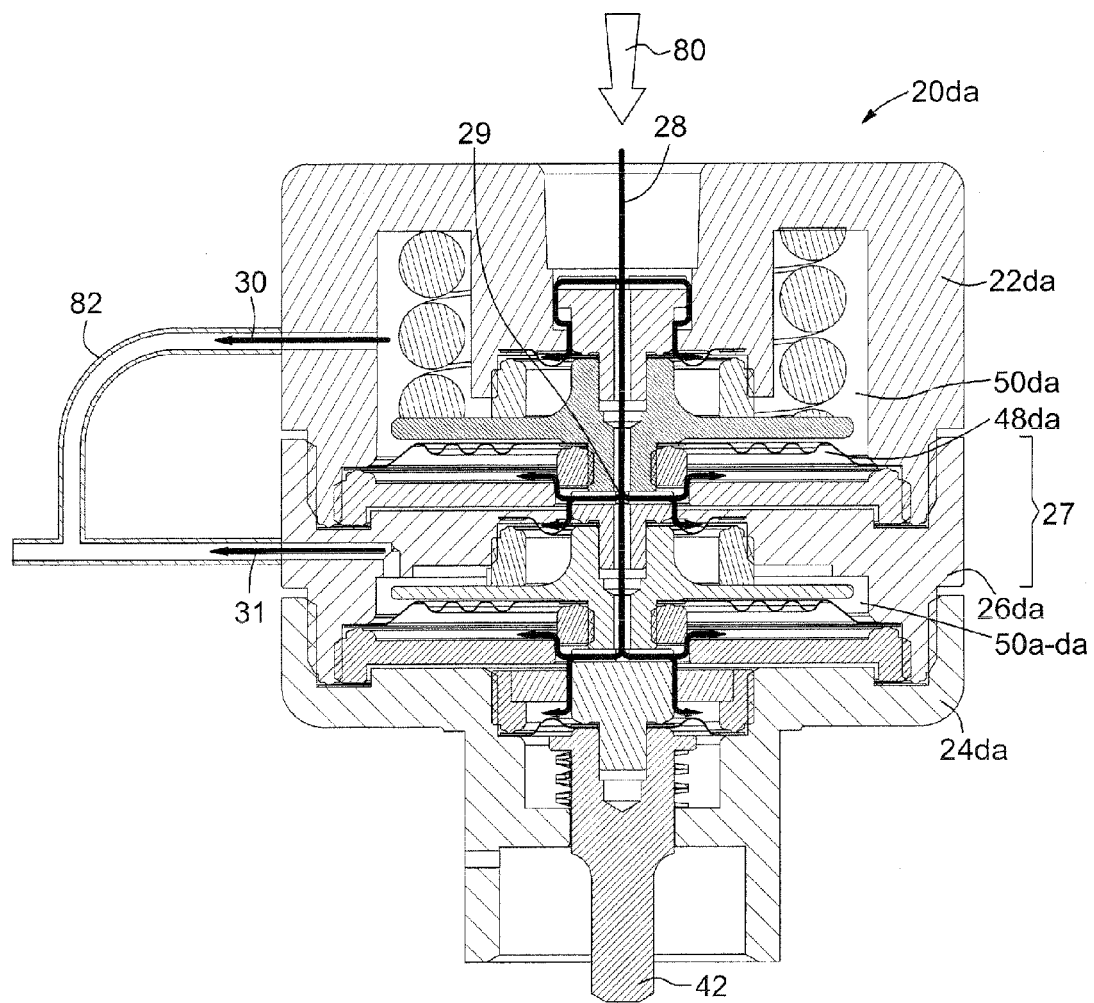
FIG. 24A is a cross-sectional view of the actuator of FIG. 24, taken along line A-A, showing the flow of fluid within the actuator.

FIGS. 24 and 24A show a double acting actuator, which is especially advantageous in high temperature applications. Indeed, extreme temperatures can render the biasing element ineffective. The double acting actuator uses the actuation pressure to move the shaft upwardly or downwardly. In this variant of the actuator, there are no vents, and the outlets are connected to an actuation line. One actuation line is used to pressure one side of the diaphragms while the other is used to flush back previous actuation gas.

Now referring to FIGS. 24 and 24A, an actuator 20da is shown in combination with a source of pressurized fluid 80 and with a source of vacuum 82. In this case, two actuating sources are used, and the vacuum source is used as a biaising mechanism. The source of pressurized fluid 80 is in fluid communication with the main inlet 28 and with the cartridge inlet 29 of the stackable secondary actuating assembly 27. Similarly, the source of vacuum 82 is in fluid communication with the main outlet 30 and with the cartridge outlet 31.

Another advantage of this variant of the actuator is that by depressurizing the second chambers 50da and 50a-da with a vacuum source 82, the actuator can be actuated more rapidly, thus increasing the actuating speed of the actuator, or in other words, the response time of the actuator.

Of course, it can also be considered to actuate the actuator by only connecting the outlets 30, 31 to a vacuum source 82 such as to draw fluid from the second chambers 50da, 50a-da, and without forcing fluid in the inlet(s) of the actuator. Depressurizing the second chambers 50da and 50a-da of the actuator has the same effect as pressurizing the first chambers 48da. Of course, both actuation sources can be used simultaneously, by forcing fluid through the main inlet 28 of the actuator and by retrieving fluid from the main outlet 30 and/or cartridge outlets 31.

Figure 24B:
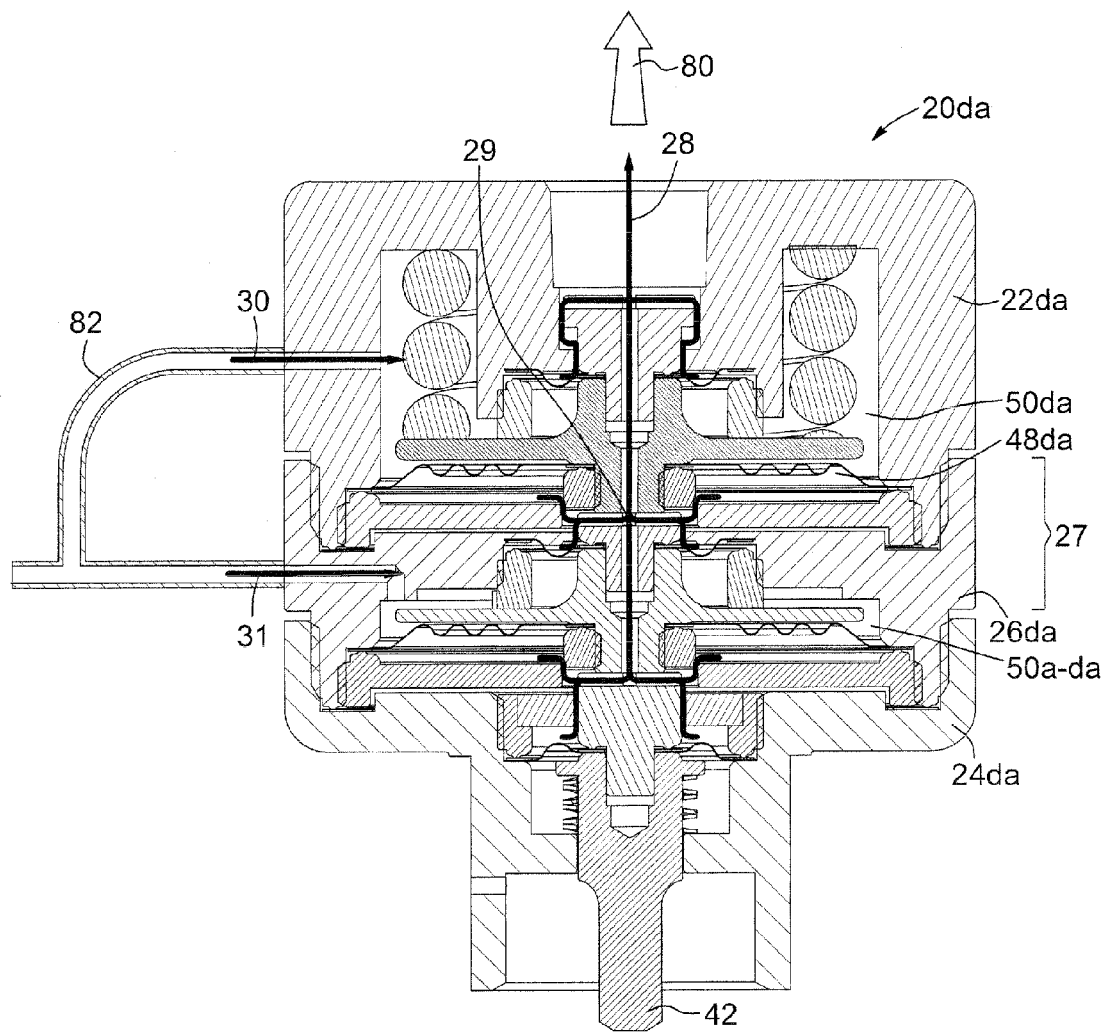
FIG. 24B is a cross-sectional view of the actuator of FIG. 24, taken along line B-B, showing the flow of pressurized fluid within the actuator.

As shown in FIG. 24B, it can also be considered to force pressurized fluid through the ports 30, 31 and/or to draw fluid from the main port 28, thus inverting the movement of the actuating stem 42 when connected to the source of pressurized fluid. Using a controllable source of pressurized fluid connected to the inlet(s) and/or the outlet(s) of the actuator allows controlling the displacement direction and the speed of the actuating stem 42.

Figure 25:
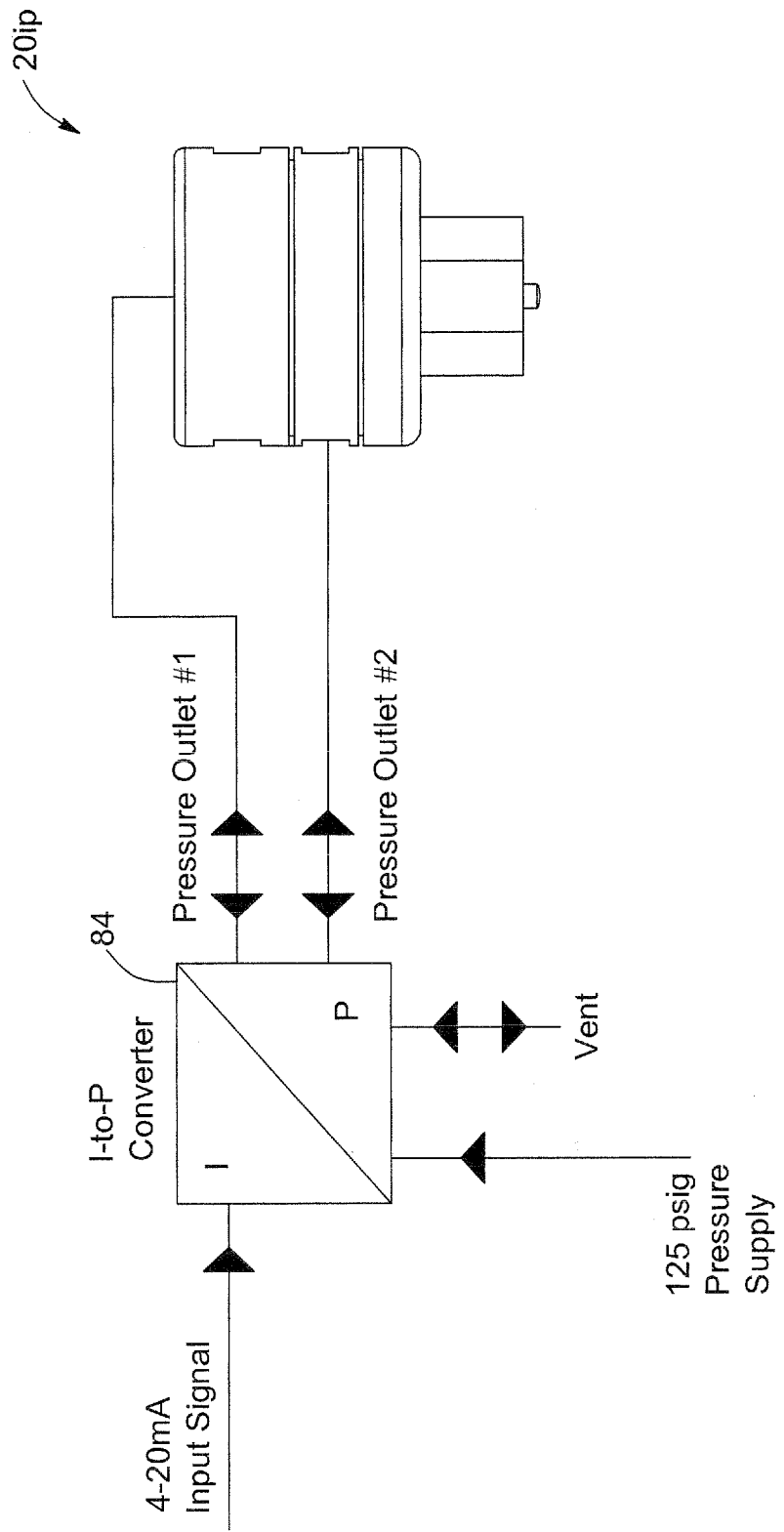
FIG. 25 is a schematic view of an actuator according to preferred embodiment of the invention, in combination with a current to pressure converter.

Now referring to FIG. 25, the actuator 20ip is used in combination with a current to pressure converter 84. This source of fluid to the actuator is controlled by a current input signal entering the current to pressure converter 84. As such, the position of the actuating stem 42 can be finely controlled and tuned according to the current signal entering the current to pressure converter. The source can be used to push fluid into one or both inlets of the actuator. Actuator position feedback could also be added to provide a complete valve positioner as commonly used in the industrial and process control field.

Figure 26:
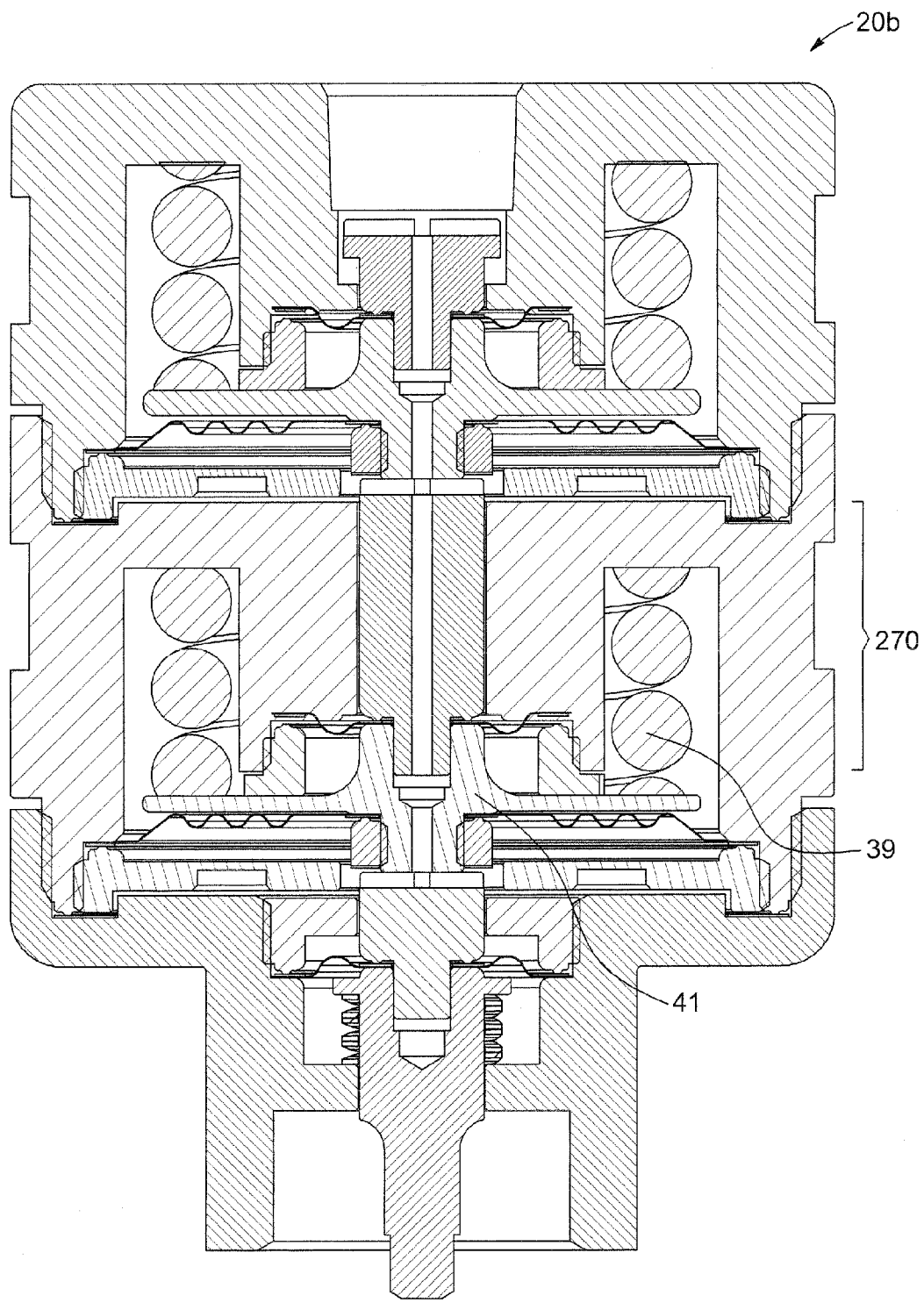
FIG. 26 is a cross-section view of an actuator according to another embodiment of the invention.

The actuator of the present invention can be used as a "spring return fail safe position linear actuator" usable with a current to pressure (I to P) converter, such as shown in FIG. 26. The actuation pressure can be increased (or decreased) gradually, in order to smoothly compress (or depress) the biasing element, allowing a precise modulating of the position of the actuating shaft. When properly calibrated, this variant of the actuator linked with an "I to P" converter becomes a linear actuator.

It can also be considered to provide each of the cartridges with its own cartridge inlet, for increasing the actuating speed and/or reducing the gas at each stage of the actuating mechanism.

Finally, with reference to FIG. 26, the actuator 26b is includes a stackable secondary cartridge assembly which comprises a cartridge biasing element 39 for biasing the intermediate piston 41 of the corresponding assembly 270, in the unactuated position. Advantageously, the cartridge biasing element allows to further control the weight-force applied on the actuating shaft in its unactuated position.

As it can be appreciated, the actuating mechanism of the present invention eliminates friction of sealing element against inner wall of cartridges, and reduces the number of moving parts, and is therefore particularly advantageous in high or low temperature applications. The sealing elements in the present actuating mechanism are static, and it is the movement or deformation of the diaphragm that initiates movement of the piston(s) and of the actuating stem or shaft.

In addition, having stackable actuating cartridges allow to increase the torque or weight-force applied to the actuating stem(s), using the same actuating pressure for the fluid. The actuator of the invention can be customized according to different types of applications, by adding or removing stackable secondary actuating cartridges and/or cartridge biasing elements.

Advantageously, the same components of the actuator can be used for a large variety of applications, limiting the number of different parts to manufacture and keep in stock. Another advantage of the invention is that it facilitates the maintenance of the actuator, the same parts being used from one actuating cartridge to another. Yet another advantage is the increase of useful life of the mechanism in addition to the increase of the time intervals between maintenance activities, since the friction between moving parts is reduced, if not eliminated, thanks to the static sealing elements.

The present invention also concerns a kit for mounting the actuator as described above. The kit includes at least a top cap and a bottom cap, a main actuation assembly which includes the deformable diaphragm and the main piston, an actuating stem or shaft, and a biasing element. The kit can also include the different connecting and sealing components, such as the nuts, screws and gaskets described above.

Of course, numerous modifications could be made to the embodiments described above without departing from the scope of the present invention.

The invention claimed is:

1. An actuator for actuating a plunger, the actuator comprising:
    a main inlet and a main outlet;
    first and second caps facing one another, the second cap being provided with a cap channel;
    a main actuation assembly provided between the first and second hollow caps, comprising:
        a diaphragm separating first and second chambers, the first chamber being in fluid communication with the main inlet, and the second chamber being fluid communication with the main outlet;
        a main piston movable between actuated and unactuated positions, the main piston having a flange extending within the second chamber and a head portion passing through the diaphragm and extending into the first chamber,
    an actuating stem slidably fitting in the cap channel, a portion of the stem extending outside of the second cap, said portion of the stem being connectable to the plunger, the actuating stem cooperating with the main piston so as to slide within the cap channel when the main piston moves between the actuated and unactuated positions; and
    a biasing element biasing the main piston towards the unactuated position;
    at least one stackable actuation assembly provided between the first and second hollow caps comprising:
        an actuating cartridge provided with a cartridge channel, a cartridge inlet and a cartridge outlet;
        an intermediate diaphragm separating first and second intermediate chambers, the first intermediate chamber being in fluid communication with the cartridge inlet and the second intermediate chamber being in fluid communication with the cartridge outlet;
        an intermediate piston movable between the actuated and unactuated positions and operatively cooperating with the main piston, the intermediate piston having:
            an axial channel in fluid communication with the main inlet,
            a flange extending within the second intermediate chamber and
            a head portion passing through the intermediate diaphragm and extending into the first intermediate chamber;
        a second diaphragm delimiting one of the first and second intermediate chambers from an adjacent chamber and allowing movement of the intermediate piston; and
        a screw having an axial channel, the axial channel of the screw being aligned with the axial channel of the intermediate piston, thereby forming a continuous path from the main inlet such that when pressurized fluid is forced through the main inlet or drawn from the main outlet, the first chambers of the main and of the stackable assemblies expand, moving the main and intermediate pistons from the unactuated position to the actuated position, the actuating stem thereby sliding within the cap channel.

2. The actuator according to claim 1, wherein the screw has a head screw abutting the head portion of one of the main piston and the intermediate piston, for affixing the second diaphragm to the intermediate piston.

3. The actuator according to claim 1, comprising removable static sealing elements respectively cooperating with the diaphragm of the main actuation assembly and with the intermediate diaphragm and the second diaphragm of the at least one stackable actuation assembly, for fluidly sealing the first and second chambers of the main actuation assembly, and the first and second intermediate chambers of the at least one stackable actuation assembly.

4. The actuator according to claim 3, wherein the static sealing elements comprise polymeric or metal gaskets.

5. The actuator according to claim 1, wherein the main actuation assembly and the at least one stackable actuation assembly comprise retaining nuts to affix the head portion of the main piston and the head portion of the intermediate piston to an inner periphery of the diaphragm and of the intermediate diaphragm, respectively.

6. The actuator according to claim 1, wherein each of the at least one stackable actuation assembly comprises a protection disk cooperating with the actuating cartridge and the intermediate diaphragm to delimit the first intermediate chamber, the protection disk also protecting the intermediate diaphragm.

7. The actuator according to claim 1, wherein the main outlet is provided in one of the first and second cap.

8. The actuator according to claim 1, wherein one of the first and second caps is provided with a circular recess, the biasing element fitting in the circular recess.

9. The actuator according to claim 1, wherein the main actuation assembly comprises a second diaphragm, said second diaphragm of the main actuation assembly delimiting the first chamber and allowing movement of the main piston.

10. The actuator according to claim 1, wherein the flange of the main piston is in contact with the biasing element.

11. The actuator according to claim 1, wherein for each of the at least one stackable actuation assembly, the cartridge inlet is in fluid communication with the main inlet.

12. The actuator according to claim 1, wherein:
the first cap, the second cap and the actuating cartridge of the at least one stackable actuation assembly have a cylindrical shape and are provided respective circular sidewalls;
said sidewalls are respectively provided with threads for engaging with threads of the sidewall of an adjacent one of said first cap, second cap and actuating cartridge.

13. The actuator according to claim 1, wherein for each of the at least one stackable actuation assembly, the actuating cartridge has a radial wall delimiting top and bottom sections, said radial wall being provided with the cartridge channel, a side wall of one of the bottom section and top section being provided with the cartridge outlet.

14. The actuator according to claim 1, wherein each of said at least one stackable cartridge assembly further comprises a cartridge biasing element for biasing the intermediate piston of the corresponding assembly towards the unactuated position.

15. The actuator according to claim 1, wherein the first cap is provided with a second cap channel, the actuator comprising a second actuating stem slidably fitting in the second cap channel of the first cap, a portion of the second actuating stem extending outside of the second cap and being connectable to a second plunger, the second actuating stem sliding within the cap channel when the main piston moves between the actuated and unactuated positions, and wherein for each of the at least one stackable actuating assembly, the cartridge inlet is in fluid communication with said main inlet, and when the pressurized fluid is forced through the cartridge inlet or drawn from the cartridge outlet, the first and intermediate chambers expand and the second actuating stem moves with the main piston from the unactuated to the actuated position, both actuating stems thereby sliding within their respective cap channels.

16. The actuator according to claim 1, comprising a source of pressurized fluid and a source of vacuum, wherein:
the source of pressurized fluid is in fluid communication with the main inlet and the cartridge inlet of said at least one stackable actuation assembly; and
the source of vacuum is in fluid communication with the main outlet and the cartridge outlet of said at least one stackable actuation assembly.

17. The actuator according to claim 16, comprising a current-to-pressure converter controlling the source of pressurized fluid and the source of vacuum.

* * * * *